(12) United States Patent
Kim et al.

(10) Patent No.: US 11,634,004 B2
(45) Date of Patent: Apr. 25, 2023

(54) INTEGRATED THERMAL MANAGEMENT SYSTEM FOR VEHICLES

(71) Applicants: HYUNDAI MOTOR COMPANY, Seoul (KR); KIA CORPORATION, Seoul (KR)

(72) Inventors: Ki Mok Kim, Hwaseong-si (KR); Man Ju Oh, Yongin-si (KR); Hyeon Keun Yun, Hwaseong-si (KR); Hyo Chan Bae, Hwaseong-si (KR); Sang Shin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 78 days.

(21) Appl. No.: 17/235,700

(22) Filed: Apr. 20, 2021

(65) Prior Publication Data
US 2022/0134837 A1 May 5, 2022

(30) Foreign Application Priority Data

Nov. 2, 2020 (KR) ........................ 10-2020-0144396

(51) Int. Cl.
*F25D 23/02* (2006.01)
*B60H 1/00* (2006.01)
*B60H 1/32* (2006.01)
*B60H 1/22* (2006.01)

(52) U.S. Cl.
CPC ..... *B60H 1/00278* (2013.01); *B60H 1/00392* (2013.01); *B60H 1/00428* (2013.01); *B60H 1/00485* (2013.01); *B60H 1/2225* (2013.01); *B60H 1/321* (2013.01); *B60H 1/3227* (2013.01); *B60H 1/3228* (2019.05); *B60H 2001/00307* (2013.01)

(58) Field of Classification Search
CPC .............. B60H 1/00278; B60H 1/3228; B60H 1/00392; B60H 1/00428; B60H 1/00485; B60H 1/2225; B60H 1/321; B60H 1/3227; B60H 2001/00307
USPC ........................................................ 62/259.2
See application file for complete search history.

(56) References Cited

U.S. PATENT DOCUMENTS

2019/0351732 A1\* 11/2019 Rajaie .................. B60H 1/3227

FOREIGN PATENT DOCUMENTS

| KR | 10-1558611 | | 10/2015 |
| KR | 20210058462 | \* | 5/2021 |

\* cited by examiner

*Primary Examiner* — Davis D Hwu
(74) *Attorney, Agent, or Firm* — Lempia Summerfield Katz LLC

(57) ABSTRACT

An integrated thermal management system for vehicles includes: a first cooling line; a second cooling line; a refrigerant line; and a bypass line configured to diverge from the second cooling line, to be connected to a chiller, and to allow a coolant to bypass a second radiator and to circulate between a high-voltage battery and the chiller.

14 Claims, 33 Drawing Sheets

INTEGRATED THERMAL MANAGEMENT SYSTEM FOR VEHICLES

CROSS-REFERENCE TO RELATED APPLICATION

This application claims priority to and the benefit of Korean Patent Application No. 10-2020-0144396, filed on Nov. 2, 2020, the entire contents of which are incorporated herein by reference.

FIELD

The present disclosure relates to an integrated thermal management system for vehicles.

BACKGROUND

The statements in this section merely provide background information related to the present disclosure and may not constitute prior art.

In recent years, the number of registered environmentally friendly vehicles, such as electric vehicles, has increased in association with a policy of popularizing environmentally friendly vehicles and preference for vehicles having high fuel economy. An electric vehicle or a fuel cell vehicle, which is one of the environmentally friendly vehicles, is a vehicle that uses an electric battery and an electric motor instead of petroleum fuel and an engine. The electric vehicle has a system configured to drive the vehicle using a motor rotated by electric power stored in a high-voltage battery, whereby the electric vehicle has advantages in that no noxious material is discharged, noise is low, and energy efficiency is high.

In a conventional vehicle using engine power, a vehicle heating system is operated using waste heat from the engine. However, the electric vehicle has a system configured to operate a heater using electricity, since the electric vehicle has no engine. As a result, the range of the electric vehicle is reduced at the time of heating.

In addition, an optimum temperature situation is desired in order for the battery module to maintain optimum performance for a long time.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides an integrated thermal management system for vehicles capable of independently effectively controlling cooling and heating of an electronic driving unit, a high-voltage battery and air conditioning of the interior of a vehicle, and improving overall energy efficiency of the vehicle through integrated thermal management.

In accordance with the present disclosure, an integrated thermal management system for vehicles includes: a first cooling line configured to allow a coolant to circulate between an electronic driving unit and a first radiator; a second cooling line configured to allow a coolant to circulate between a high-voltage battery and a second radiator; a refrigerant line configured to allow a refrigerant to flow in order of a compressor, an inner condenser of an indoor air conditioner, and an outdoor condenser positioned outside a vehicle and to allow the refrigerant discharged from the outdoor condenser to be introduced into the compressor through an evaporator of the indoor air conditioner or a chiller; and a bypass line configured to diverge from the second cooling line, be connected to the chiller, and to allow the coolant to bypass the second radiator and to circulate between the high-voltage battery and the chiller.

A first expansion valve may be provided in a refrigerant inlet of the chiller, and a second expansion valve may be provided in a refrigerant inlet of the evaporator.

A water heater may be provided downstream of the high-voltage battery in the second cooling line.

The first cooling line and the second cooling line may be connected to an integrated reservoir together such that coolant mixing is partially performed.

The first radiator and the second radiator may be integrally coupled to each other.

In the indoor air conditioner, air passing through the inner condenser may pass through an electric heater.

An auxiliary line configured to allow the refrigerant to bypass the outdoor condenser may be connected to the refrigerant line.

When the outdoor condenser is frosted in a heat pump mode, the refrigerant in the refrigerant line may bypass the outdoor condenser through the auxiliary line and flow to the chiller.

A dehumidification line configured to allow the refrigerant flowing in the inner condenser to be divided, to bypass the outdoor condenser, and to be introduced into the evaporator may be connected to the refrigerant line.

A third expansion valve may be provided upstream of a divergence point of the dehumidification line in the refrigerant line, and in a dehumidification mode, the refrigerant expanded through the third expansion valve may be supplied to the chiller and at the same time supplied to the evaporator through the dehumidification line, and the refrigerants passing through the chiller and the evaporator may join each other and may be supplied to the compressor and the inner condenser.

An auxiliary line configured to allow the refrigerant flowing in the inner condenser to be divided, to bypass the outdoor condenser, and to flow to the evaporator or the chiller and a dehumidification line configured to allow the refrigerant flowing in the inner condenser to bypass the outdoor condenser and to be introduced into the evaporator may be connected to the refrigerant line.

A first pump may be provided in the first cooling line, and a second pump may be provided in the second cooling line.

A three-way valve may be provided at a divergence point between the second cooling line and the bypass line, and the second pump may be provided between the three-way valve and the high-voltage battery.

The first pump, the second pump, the three-way valve, and the chiller may be coupled to each other to form a module.

The first cooling line and the second cooling line are connected to the integrated reservoir together such that coolant mixing is partially performed, and the first pump, the second pump, the three-way valve, and the chiller may be coupled to the integrated reservoir to form a module.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 31:
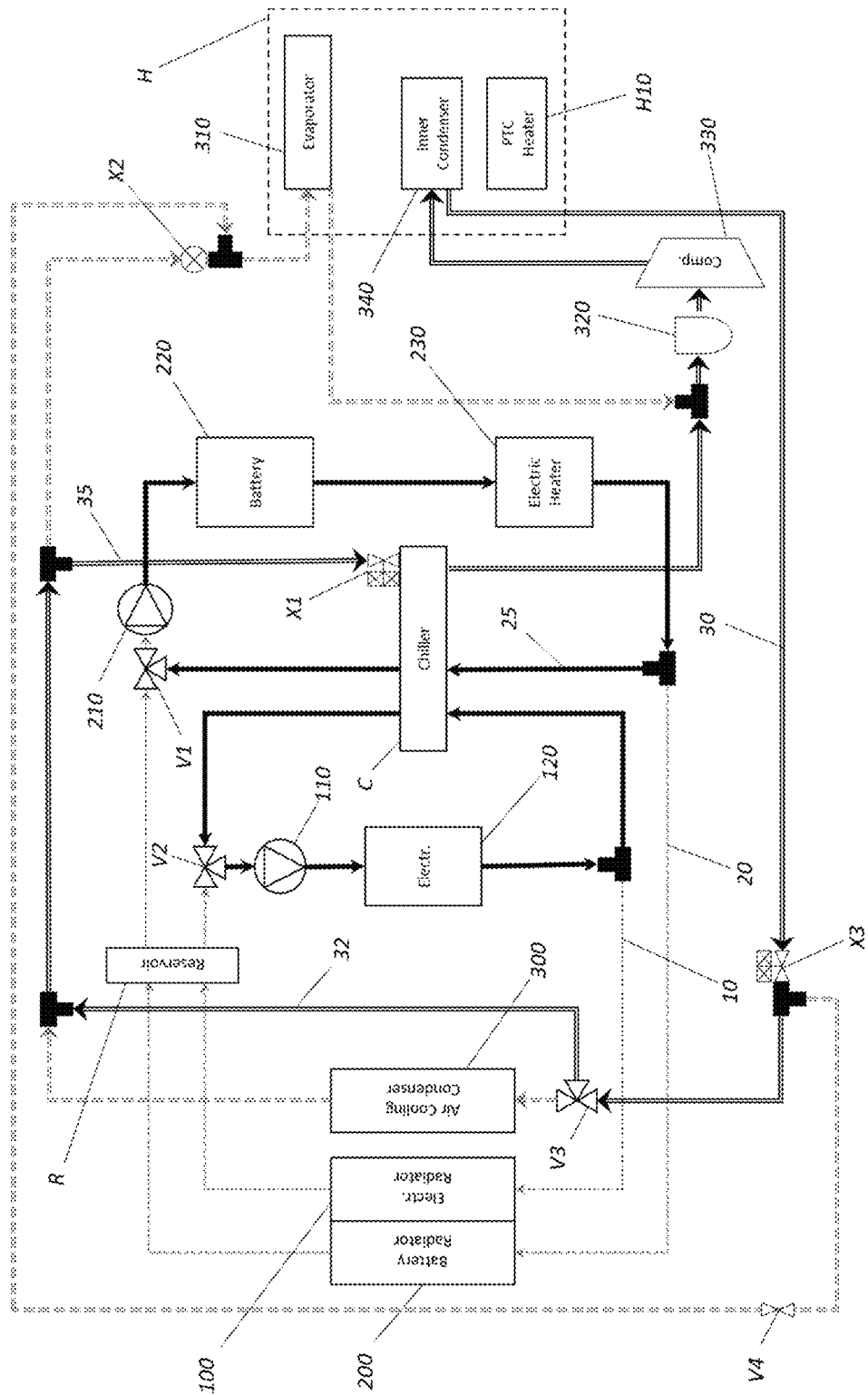
Figure 32:
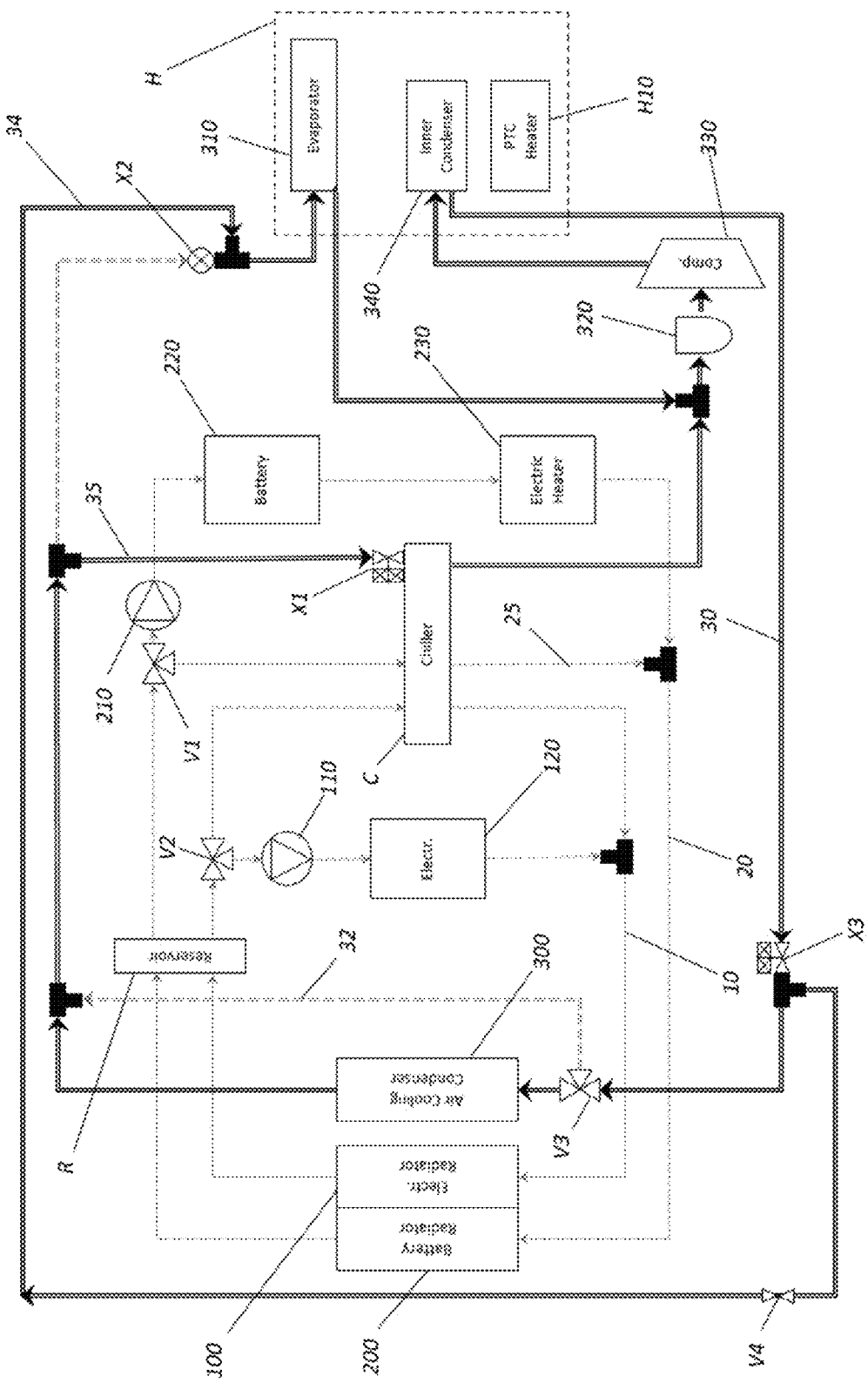
Figure 33:
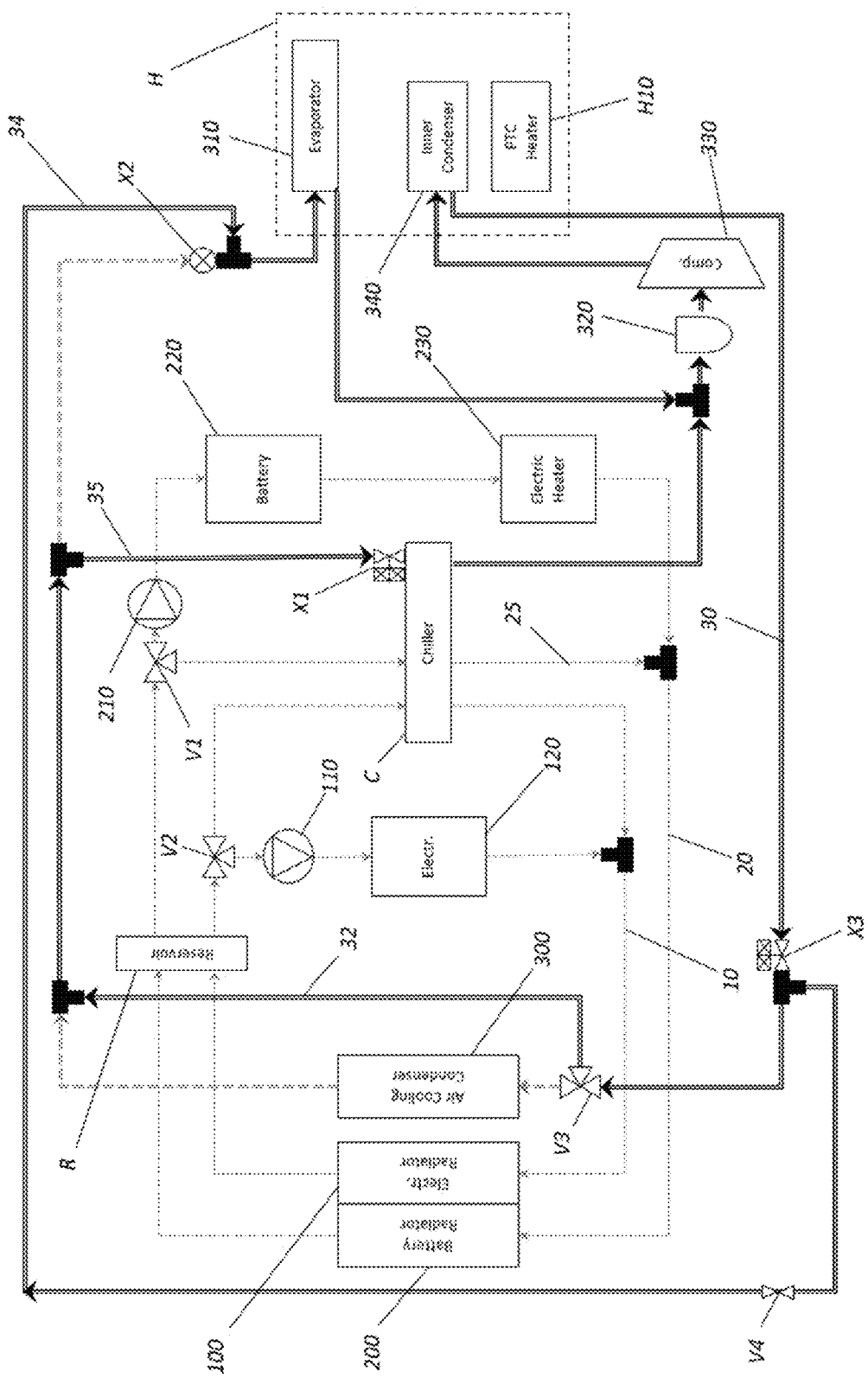

FIG. 31 is a view showing mode-based operations of an integrated thermal management system for vehicles according to another form of the present disclosure in which when the outdoor condenser is frosted as the result of excessive evaporation of the refrigerant, a third valve is temporarily controlled such that the refrigerant bypasses the outdoor condenser through the auxiliary line and ice formed on the surface of the outdoor condenser 300 is naturally melted by external air;

FIG. 32 is a view showing mode-based operations of an integrated thermal management system for vehicles according to another form of the present disclosure in which dehumidification is performed using both the evaporator and the inner condenser, in which case temperature is increased in the inner condenser through the operation of the heat pump using heat absorbed by the outdoor condenser;

FIG. 33 is a view showing mode-based operations of an integrated thermal management system for vehicles according to another form of the present disclosure in which, control may be temporarily performed to defrost the frosted outdoor condenser.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1 to 15 are views showing mode-based operations of an integrated thermal management system for vehicles according to one form of the present disclosure, and FIGS. 16 to 33 are views showing mode-based operations of an integrated thermal management system for vehicles according to another form of the present disclosure.

FIGS. 1 to 15 are views showing the mode-based operations of the integrated thermal management system for vehicles according to one form of the present disclosure, which corresponds to a case in which the principle of a heat pump is not used.

The integrated thermal management system for vehicles according to the present disclosure may be applied to a vehicle driven through a battery and a motor, such as an electrical vehicle or a fuel cell vehicle. The integrated thermal management system according to the present disclosure may perform cooling of an electronic driving unit formed by a motor, an inverter, and a converter, cooling and heating of a high-voltage battery, and cooling and heating of an indoor air conditioner.

Specifically, the integrated thermal management system according to the present disclosure may include: a first cooling line 10 configured to allow a coolant to circulate between an electronic driving unit 120 and a first radiator 100; a second cooling line 20 configured to allow a coolant to circulate between a high-voltage battery 220 and a second radiator 200; a refrigerant line 30 configured to allow a refrigerant to flow in order of a compressor 330, an inner condenser of an indoor air conditioner H, and an outdoor condenser 300 outside a vehicle, and to allow the refrigerant discharged from the outdoor condenser 300 to be introduced into the compressor 330 through an evaporator 310 of the indoor air conditioner H or a chiller C; and a bypass line 25 diverging from the second cooling line 20 so as to be connected to the chiller C, the bypass line 25 being configured to allow the coolant to bypass the second radiator 200 and to circulate between the high-voltage battery 220 and the chiller C.

The first cooling line 10 allows the coolant to circulate between the electronic driving unit 120 and the first radiator 100. Since the electronic driving unit 120 is relatively stable even in a high-temperature condition, desired cooling may be realized only through circulation of the coolant. The second cooling line 20 allows the coolant to circulate between the high-voltage battery 220 and the second radiator 200. In the case in which it is desired to cool the high-voltage battery 220 in a mild condition, cooling is performed first using the coolant, as described above. Meanwhile, the bypass line 25 diverges from the second cooling line 20 and is connected to the chiller C. Consequently, the coolant may bypass the second radiator 200 and circulate between the high-voltage battery 220 and the chiller C.

In order to perform circulation through the cooling lines, a first pump 110 may be provided in the first cooling line 10, and a second pump 210 may be provided in the second cooling line 20. A three-way valve V1 may be provided at a divergence point between the second cooling line 20 and the bypass line 25, and the second pump 210 may be provided between the three-way valve V1 and the high-voltage battery 220. According to the operation of the three-way valve V1, the coolant may circulate between the high-voltage battery 220 and the second radiator 200 or may circulate between the high-voltage battery 220 and the chiller C. In the case in which mild cooling of the high-voltage battery 220 is desired, cooling is performed through the second radiator 200. In the case in which heavy cooling of the high-voltage battery 220 is desired, cooling is performed through the chiller C.

The first pump 110, the second pump 210, the three-way valve V1, and the chiller C may be coupled to each other to form a module. The first cooling line 10 and the second cooling line 20 are connected to an integrated reservoir R together such that coolant mixing is partially performed. The first pump 110, the second pump 210, the three-way valve V1, and the chiller C may be coupled to the integrated reservoir R to form a module. Since the coolant for the electronic driving unit 120 and the coolant for the high-voltage battery 220 are different in management temperature from each other, it is desired to store the coolants in the integrated reservoir R in a state of being separated from each other through a partition. At the time of coolant replenishment, however, the coolants may be partially mixed with each other. A water heater 230 is provided downstream of the high-voltage battery 220 in the second cooling line. In the case in which it is desired to highly heat the high-voltage battery 220, the water heater 230 is operated.

The first radiator 100 and the second radiator 200 may be integrally coupled to each other. That is, the radiators may have separate independent channels, and may be fastened to each other in the state in which an insulation member is provided to inhibit heat exchange therebetween, whereby the radiators may be integrally coupled to each other. As a result, a compacter layout may be realized.

Meanwhile, the refrigerant line 30 allows the refrigerant to flow in order of the compressor 330, the inner condenser of the indoor air conditioner H, and the outdoor condenser 300 outside the vehicle. The refrigerant discharged from the outdoor condenser 300 selectively or simultaneously passes through the evaporator 310 of the indoor air conditioner H or the chiller C and is then introduced into the compressor 330 via an accumulator 320.

A first expansion valve X1 may be provided in a refrigerant inlet of the chiller C, and a second expansion valve X2 may be provided in a refrigerant inlet of the evaporator 310. As a result, expansion and evaporation of the coolant are possible.

Meanwhile, in the indoor air conditioner H, air passing through the inner condenser 340 may pass through an electric heater H10. As a result, independent heating of the interior of the vehicle is possible.

Figure 1:
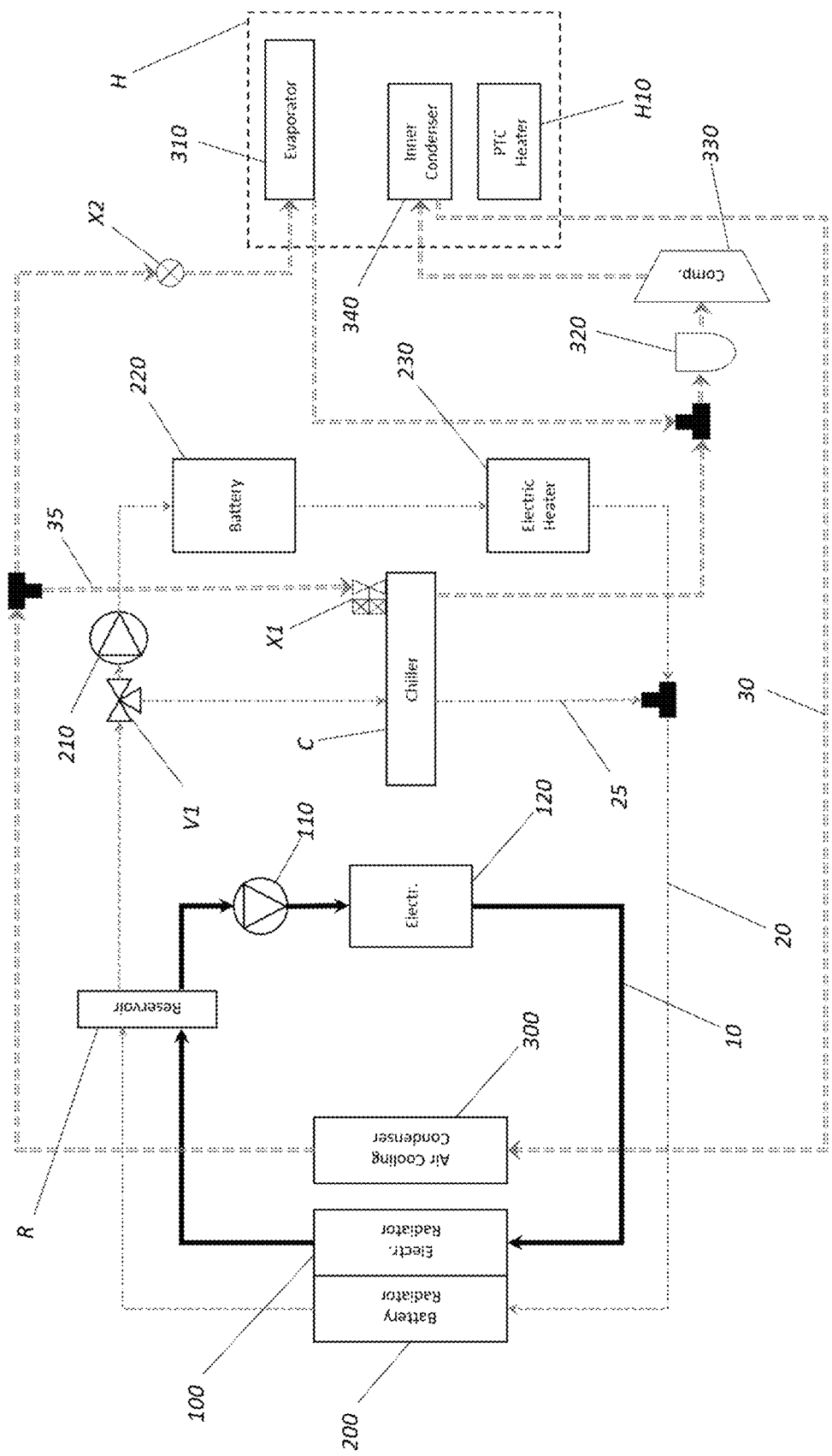
FIG. 1 is a view showing mode-based operations of an integrated thermal management system for vehicles according to one form of the present disclosure in which the electronic driving unit 120 is cooled through the first radiator.
Figure 2:
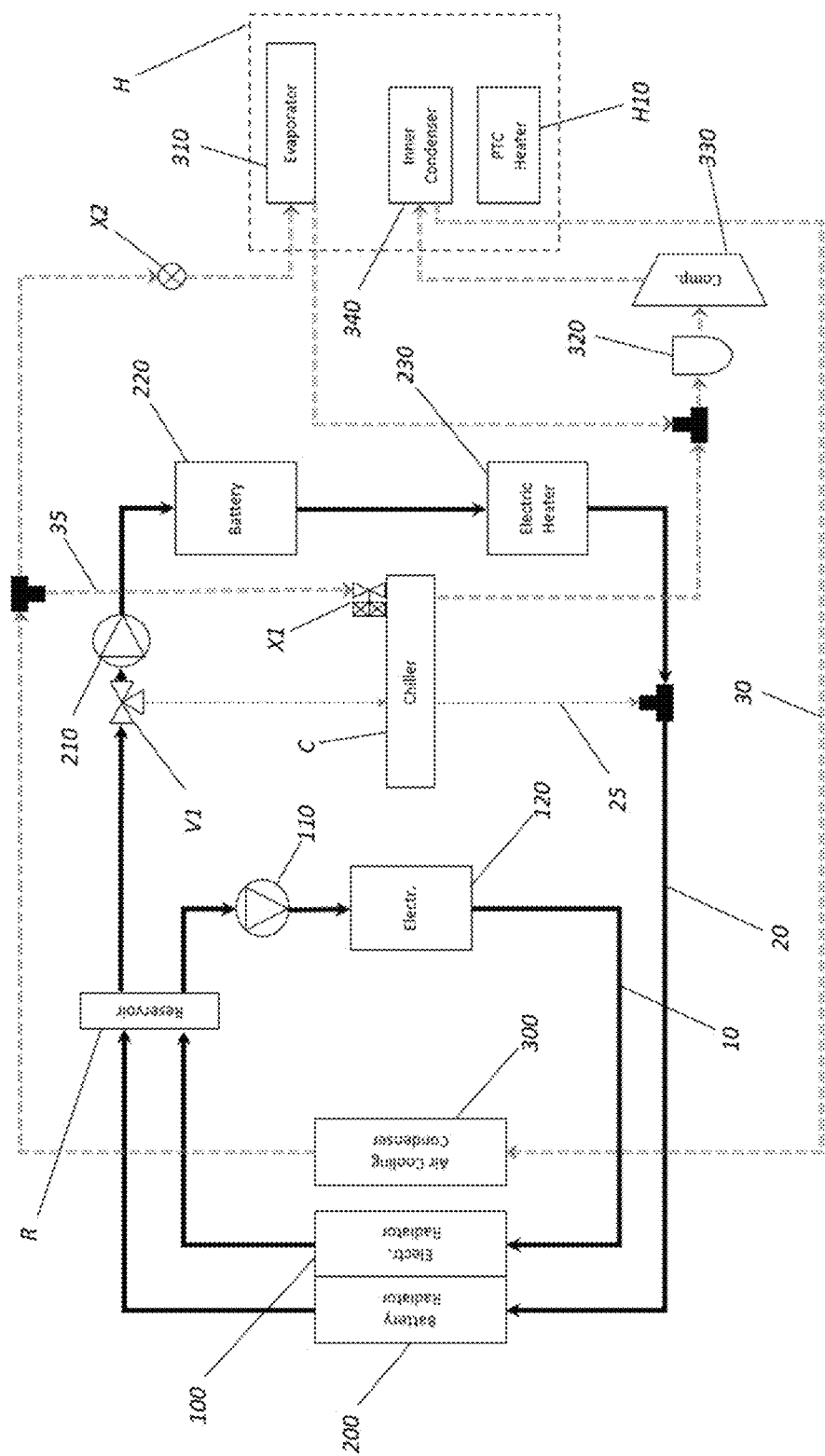
FIG. 2 is a view showing mode-based operations of an integrated thermal management system for vehicles according to one form of the present disclosure In which the electronic driving unit is cooled through the first radiator and the high-voltage battery is cooled through the second radiator.

FIGS. 1 to 15 are views showing the mode-based operations of the integrated thermal management system for vehicles according to one form of the present disclosure. FIG. shows the case in which the electronic driving unit 120 is cooled through the first radiator 100. FIG. 2 shows the case in which the electronic driving unit 120 is cooled through the first radiator 100 and the high-voltage battery 220 is cooled through the second radiator 200.

Figure 3:
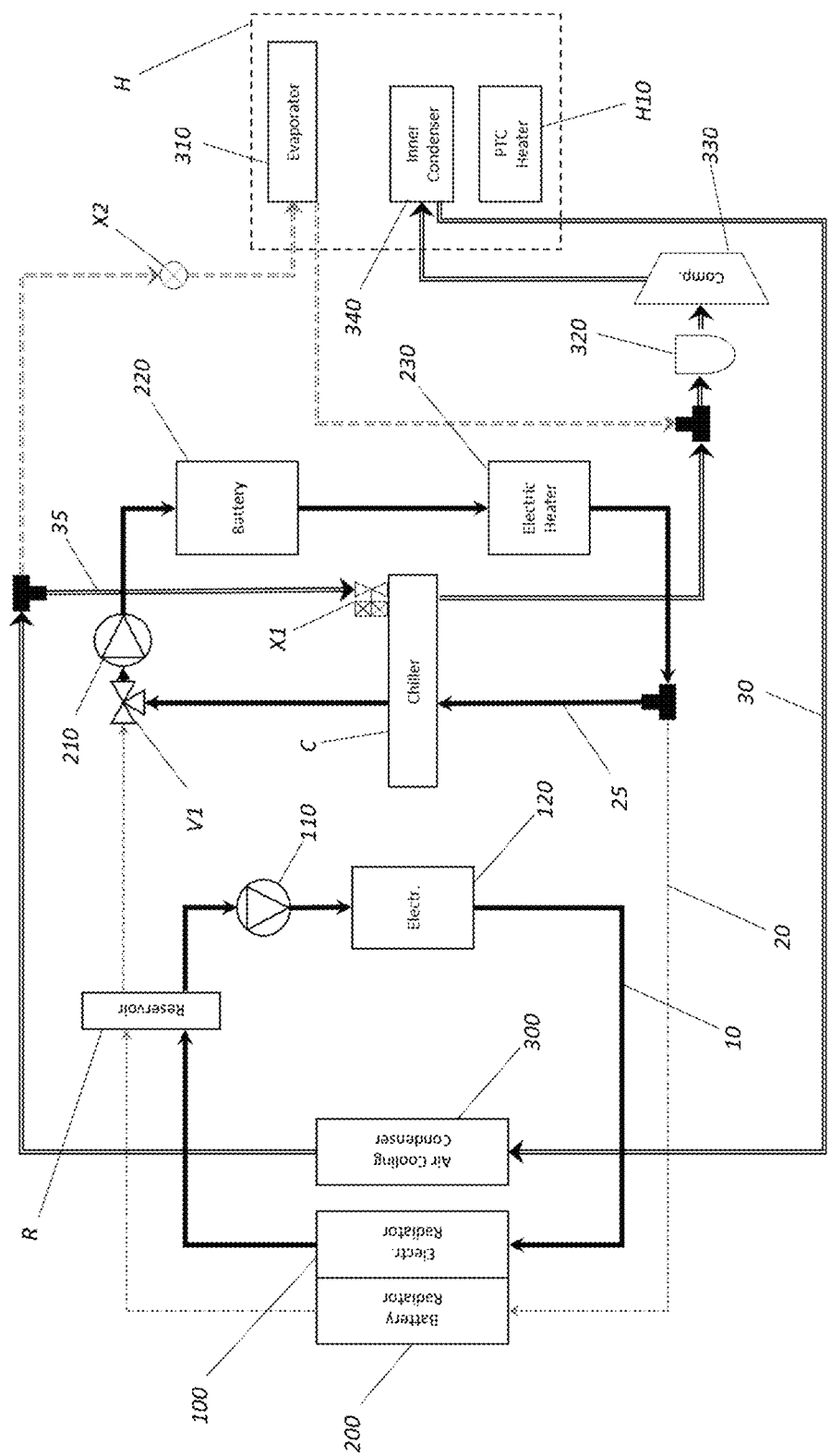
FIG. 3 is a view showing mode-based operations of an integrated thermal management system for vehicles according to one form of the present disclosure in which the electronic driving unit is cooled and the high-voltage battery is cooled through the chiller.

FIG. 3 shows the case in which the electronic driving unit 120 is cooled and the high-voltage battery 220 is cooled through the chiller C. In this case, a blower is not operated in the indoor air conditioner H, and therefore waste heat from the inner condenser 340 is inhibited from being introduced into the interior of the vehicle.

Figure 4:
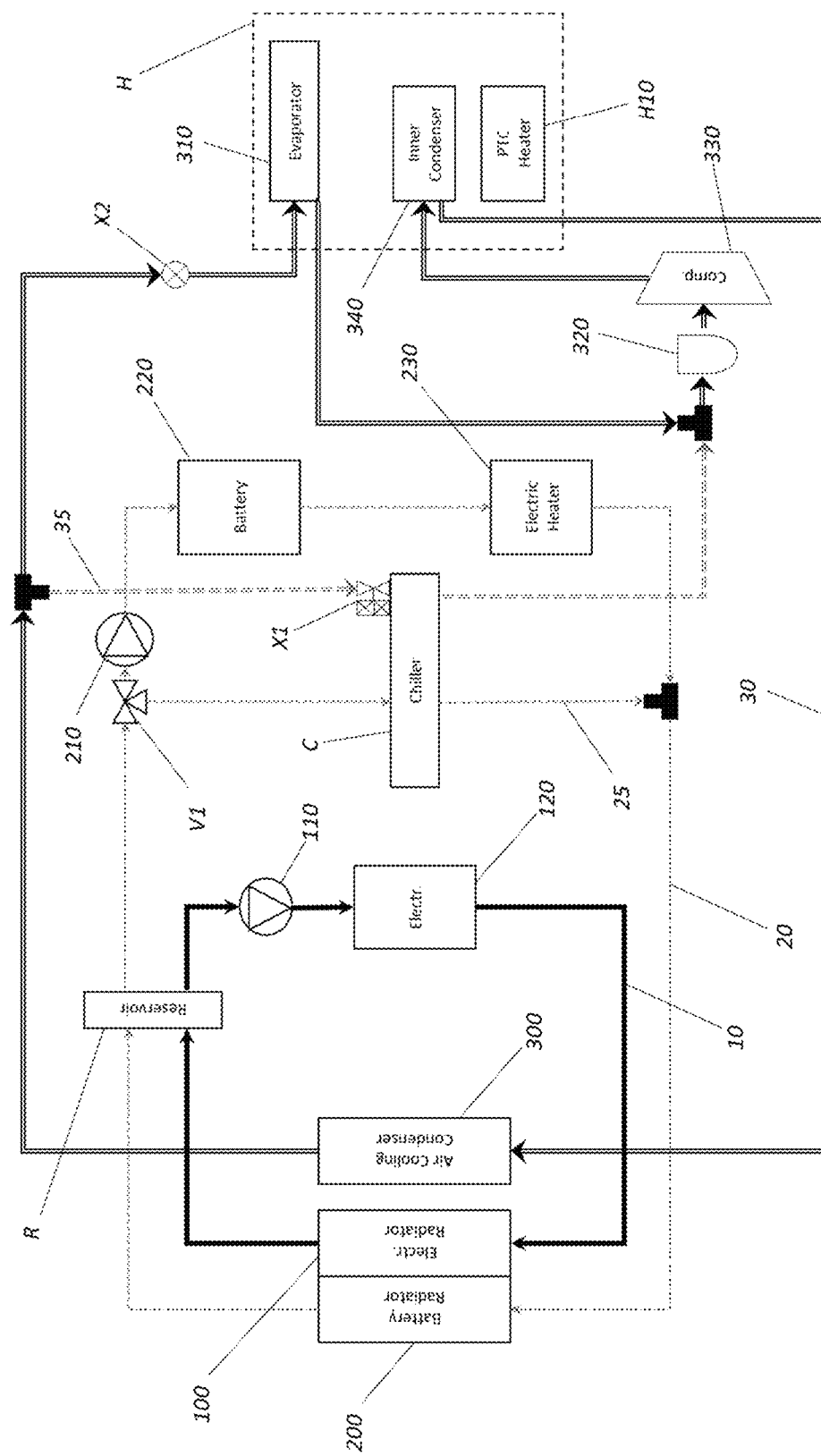
FIG. 4 is a view showing mode-based operations of an integrated thermal management system for vehicles according to one form of the present disclosure in which the electronic driving unit is cooled and at the same time the interior of the vehicle is cooled through the evaporator.

FIG. 4 shows the case in which the electronic driving unit 120 is cooled and at the same time the interior of the vehicle is cooled through the evaporator 310. In this case, the blower of the indoor air conditioner H is operated but air is inhibited from passing through the inner condenser 340 by a temperature control door therein such that only cool air is introduced into the interior of the vehicle. Alternatively, air may be discharged in the state in which the temperature thereof is controlled by the temperature control door. In this case, the first expansion valve X1 is closed such that the refrigerant is introduced only into the evaporator 310.

Figure 5:
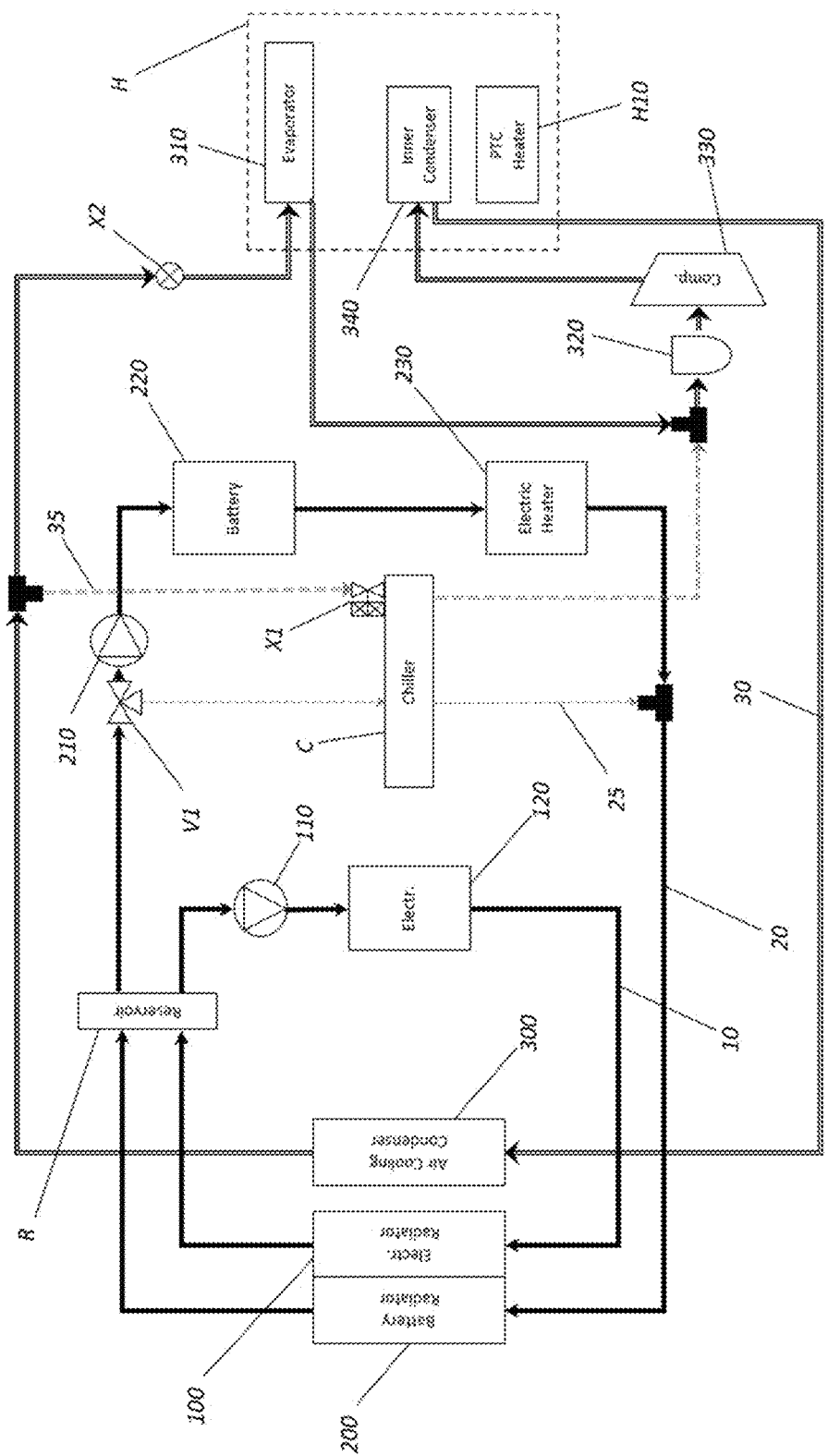
FIG. 5 is a view showing mode-based operations of an integrated thermal management system for vehicles according to one form of the present disclosure in which the high-voltage battery is further cooled, compared to the case of FIG. 4.
Figure 6:
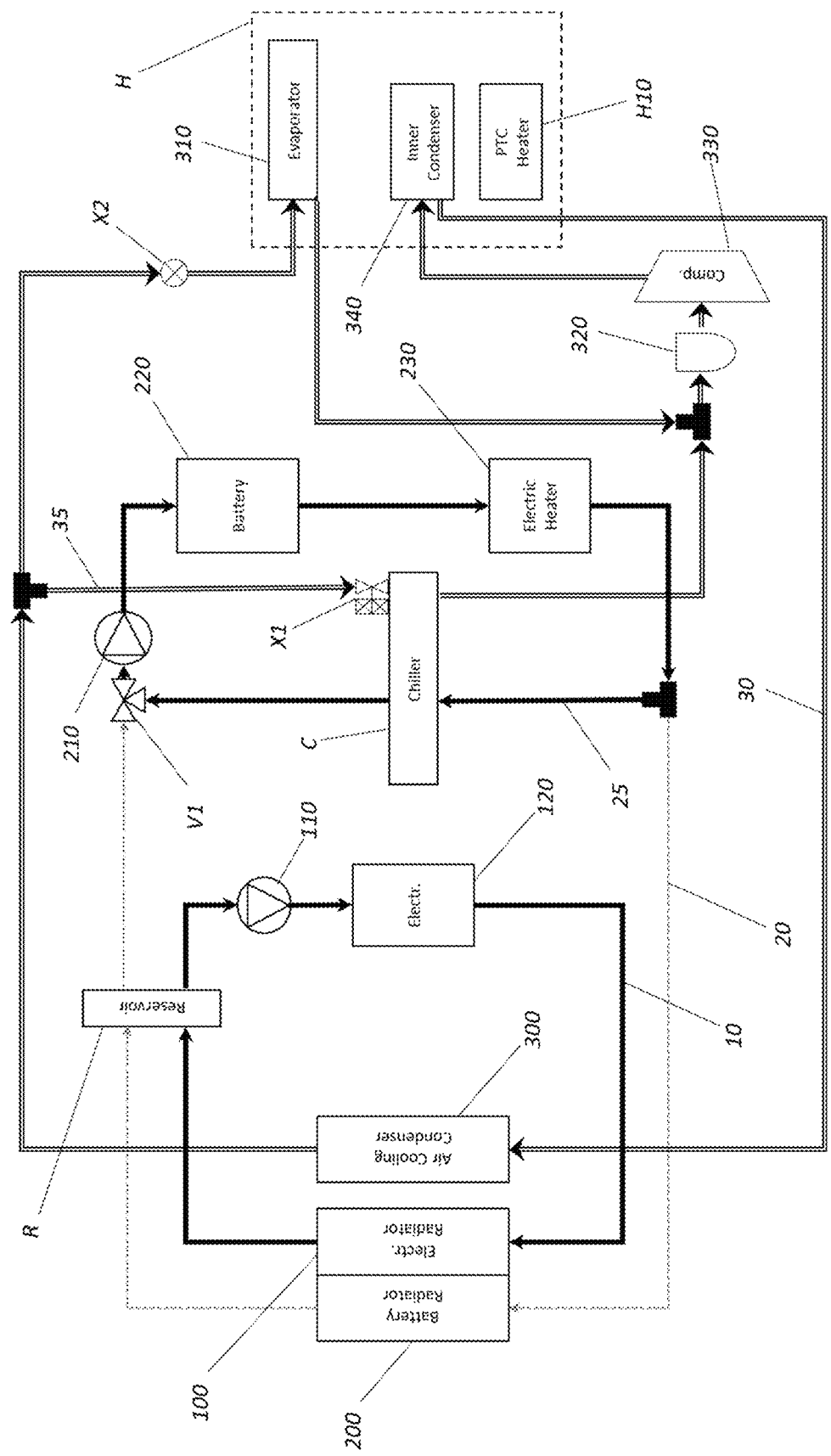
FIG. 6 is a view showing mode-based operations of an integrated thermal management system for vehicles according to one form of the present disclosure in which the high-voltage battery is more strongly cooled, in which case the high-voltage battery is cooled through the chiller.

FIG. 5 shows the case in which the high-voltage battery 220 is further cooled, compared to the case of FIG. 4. FIG. 6 shows the case in which the high-voltage battery 220 is more strongly cooled, in which case the high-voltage battery 220 is cooled through the chiller C. In this case, the refrigerant is expanded through both the first expansion valve X1 and the second expansion valve X2.

Figure 7:
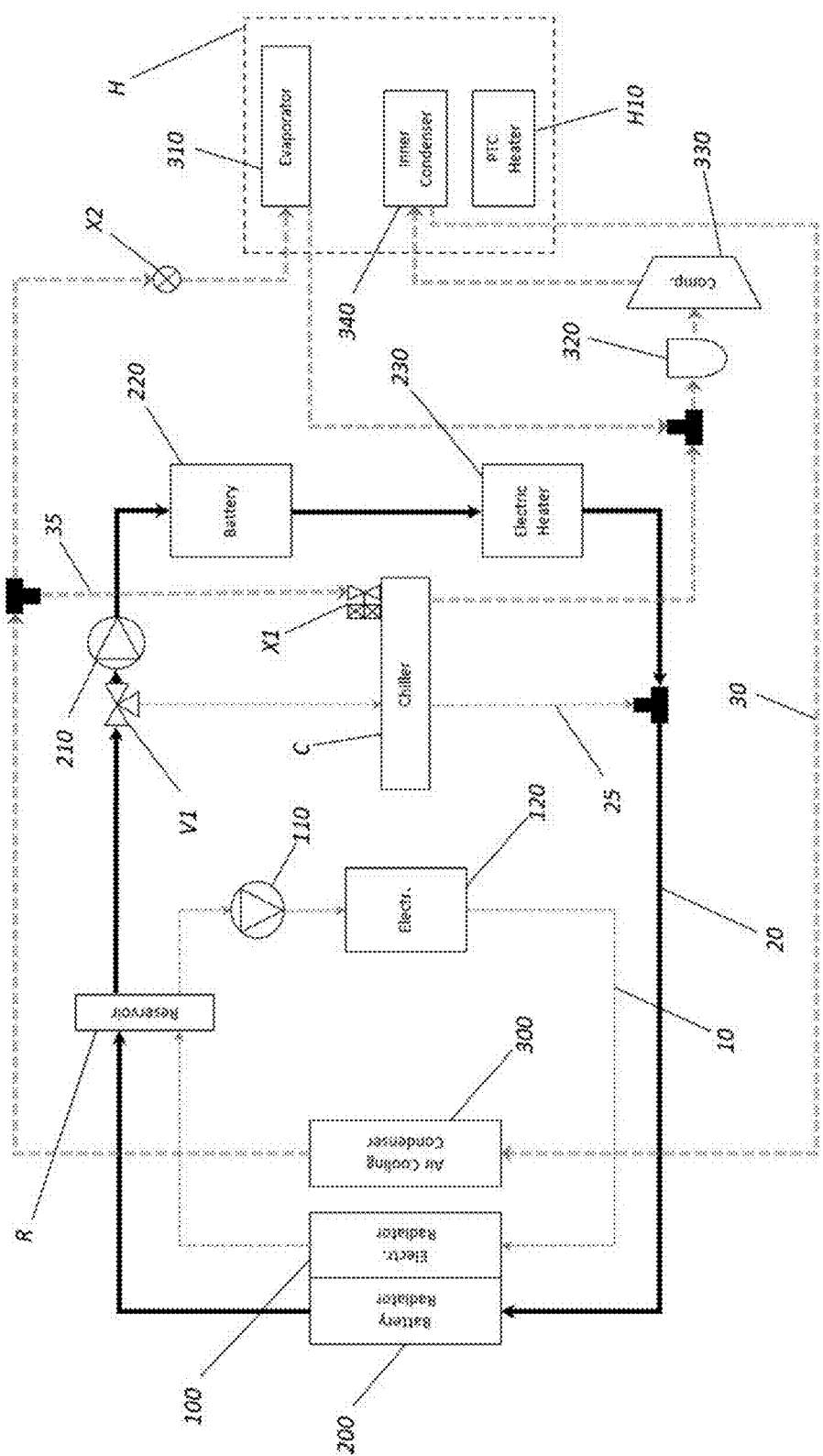
FIG. 7 is a view showing mode-based operations of an integrated thermal management system for vehicles according to one form of the present disclosure in which the high-voltage battery is cooled using the coolant.
Figure 8:
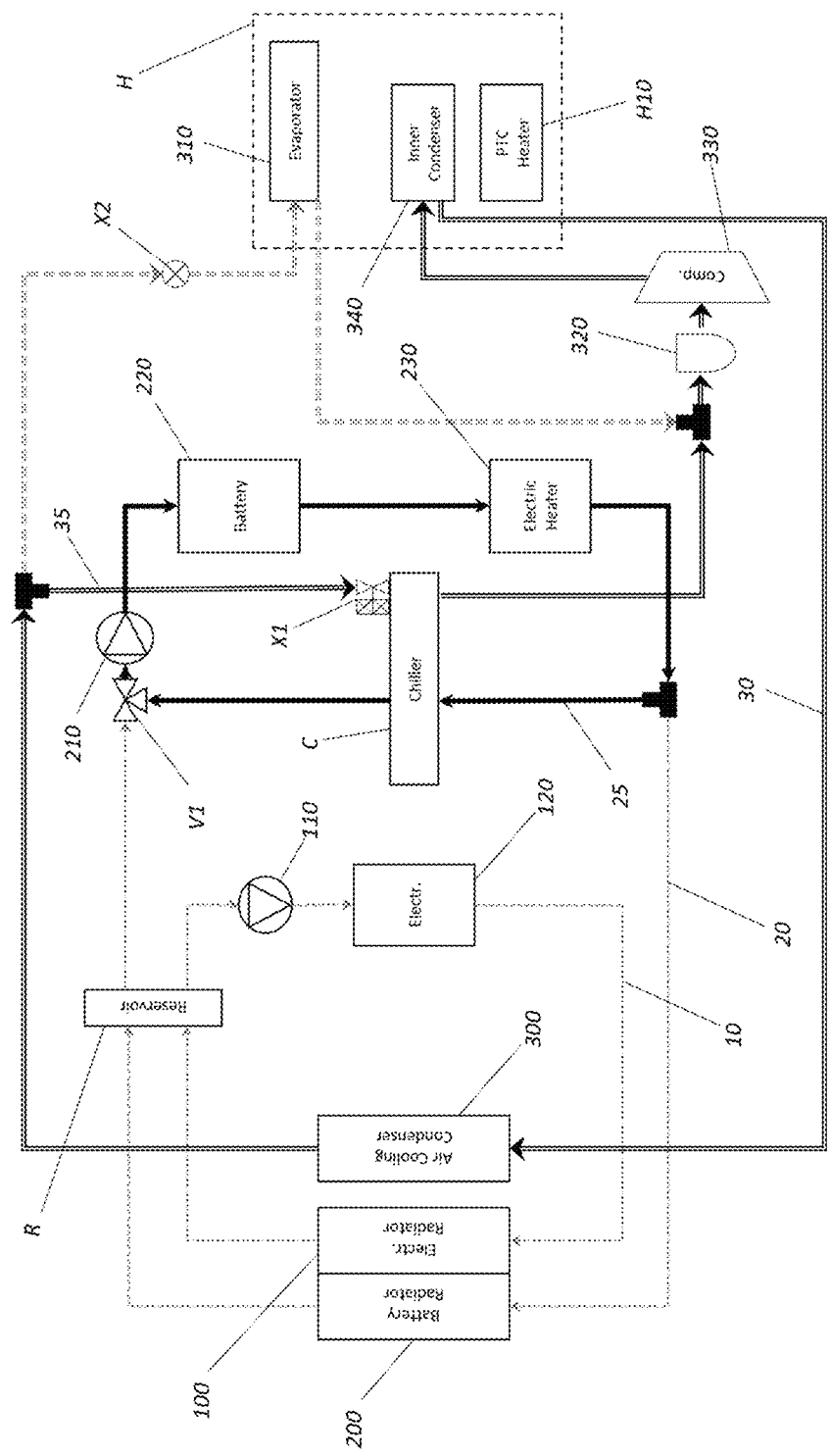
FIG. 8 is a view showing mode-based operations of an integrated thermal management system for vehicles according to one form of the present disclosure in which the high-voltage battery is more strongly cooled through the chiller.

FIG. 7 shows the case in which the high-voltage battery 220 is cooled using the coolant, and FIG. 8 shows the case in which the high-voltage battery 220 is more strongly cooled through the chiller C. In this case, the second expansion valve X2 is closed such that the refrigerant is not introduced into the evaporator 310.

Figure 9:
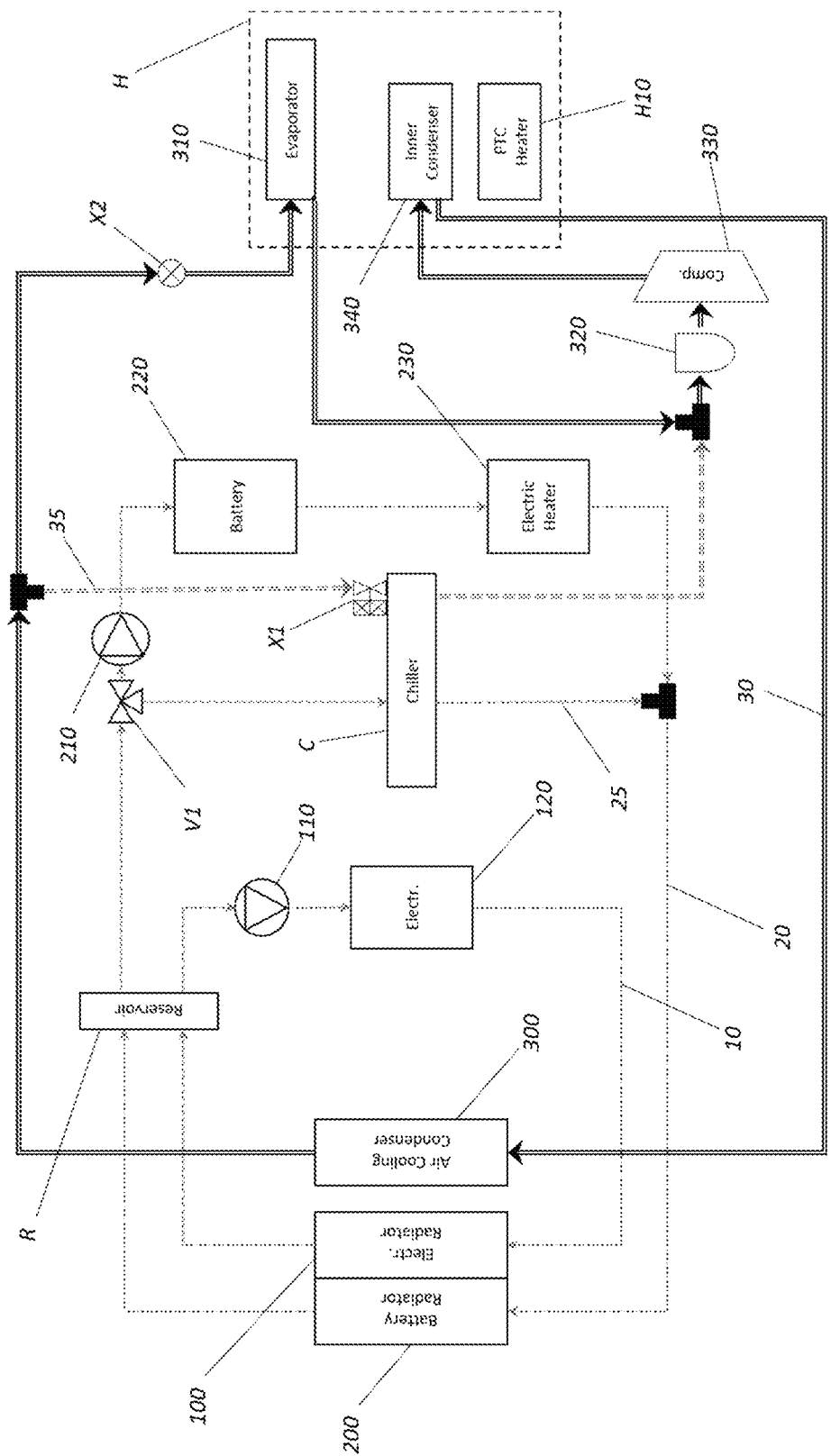
FIG. 9 is a view showing mode-based operations of an integrated thermal management system for vehicles according to one form of the present disclosure in which only the interior of the vehicle is cooled through the evaporator, in which case air is inhibited from passing through the inner condenser.
Figure 10:
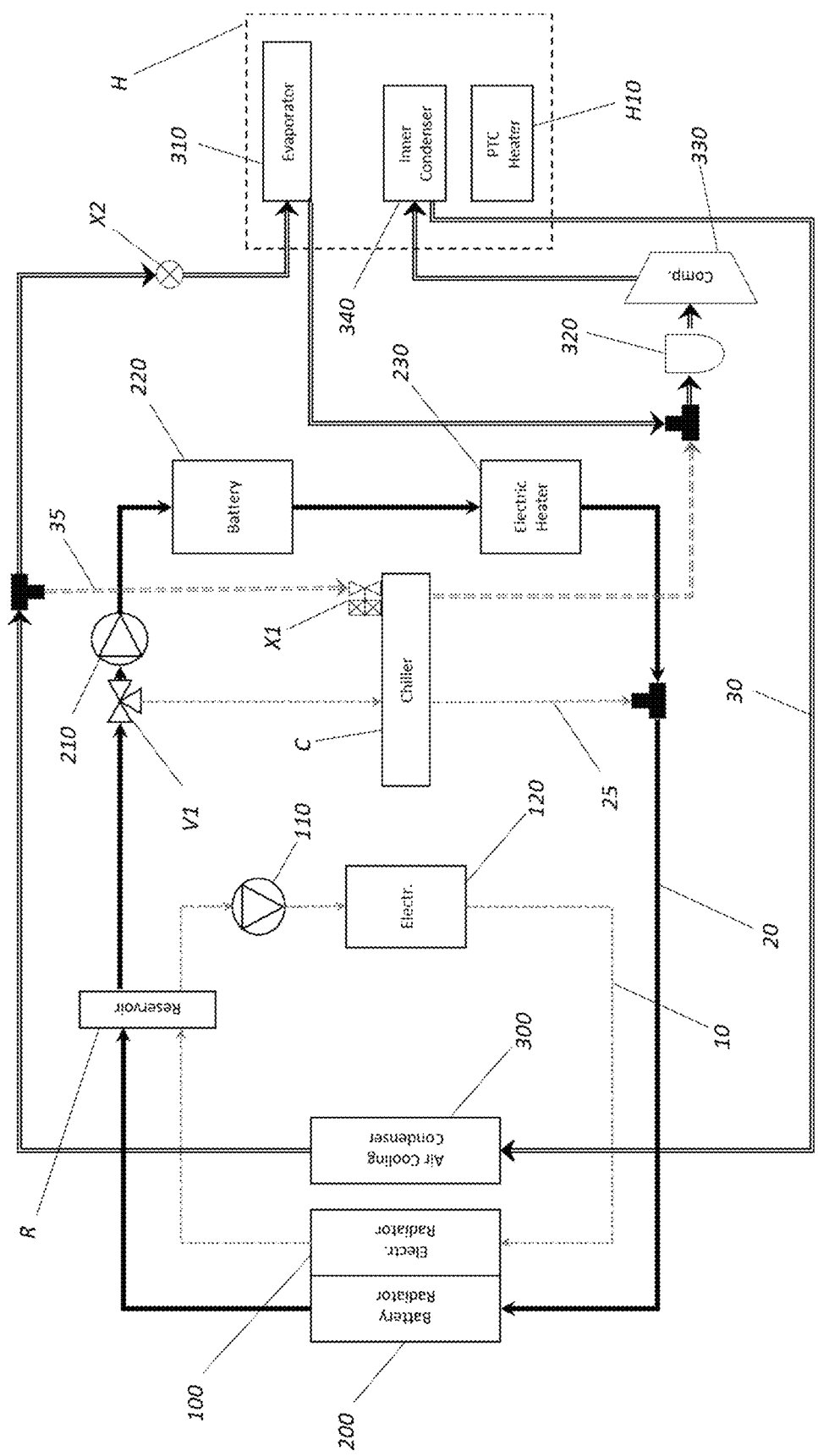
FIG. 10 is a view showing mode-based operations of an integrated thermal management system for vehicles according to one form of the present disclosure in which the high-voltage battery is also cooled using the coolant at the same time, compared to the case of FIG. 9.
Figure 11:
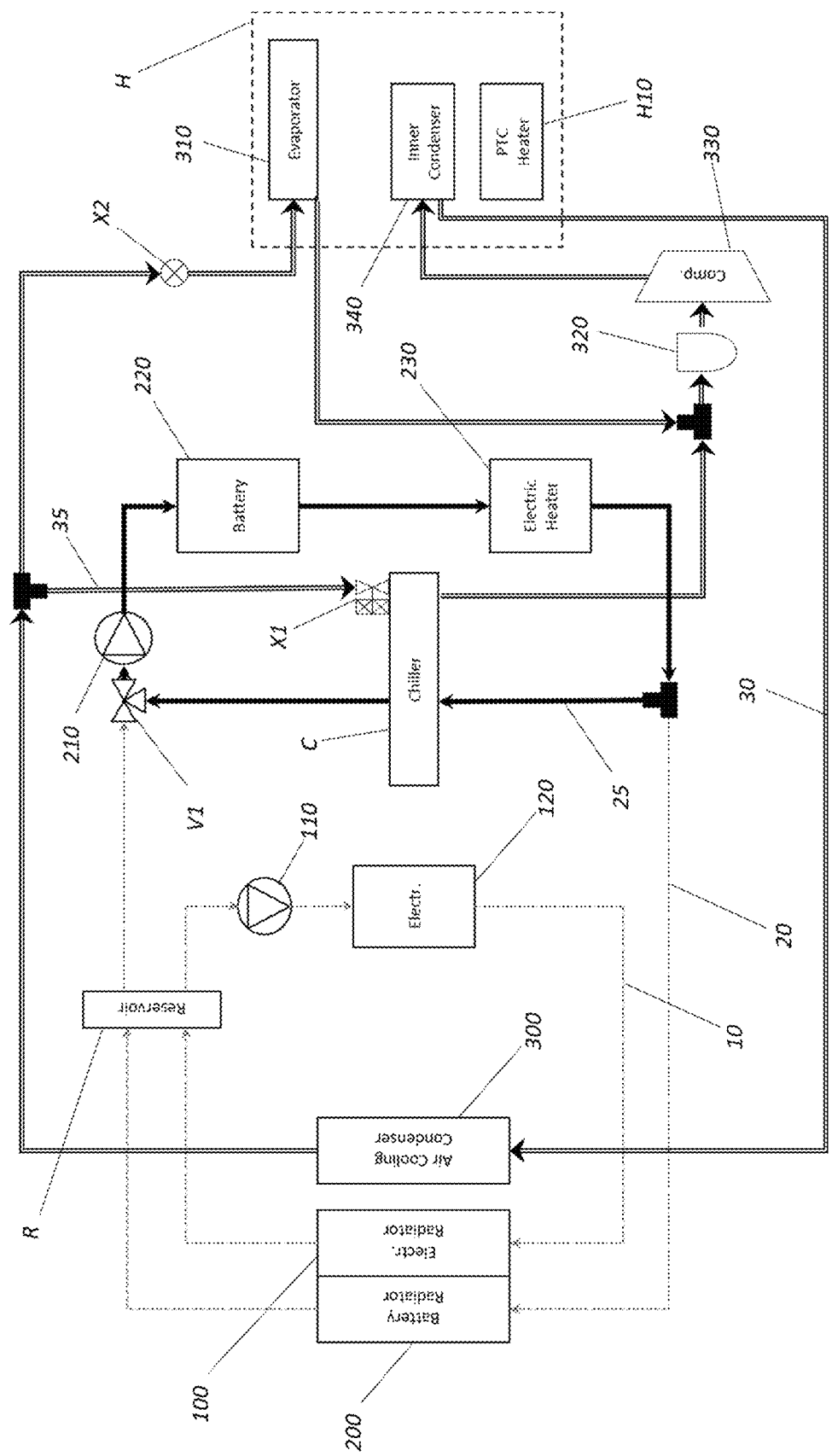
FIG. 11 is a view showing mode-based operations of an integrated thermal management system for vehicles according to one form of the present disclosure in which both the interior of the vehicle and the high-voltage battery are cooled using the refrigerant.

FIG. 9 shows the case in which only the interior of the vehicle is cooled through the evaporator 310, in which case air is inhibited from passing through the inner condenser 340. FIG. 10 shows the case in which the high-voltage battery 220 is also cooled using the coolant at the same time, compared to the case of FIG. 9. FIG. 11 shows the case in which both the interior of the vehicle and the high-voltage battery 220 are cooled using the refrigerant.

Figure 12:
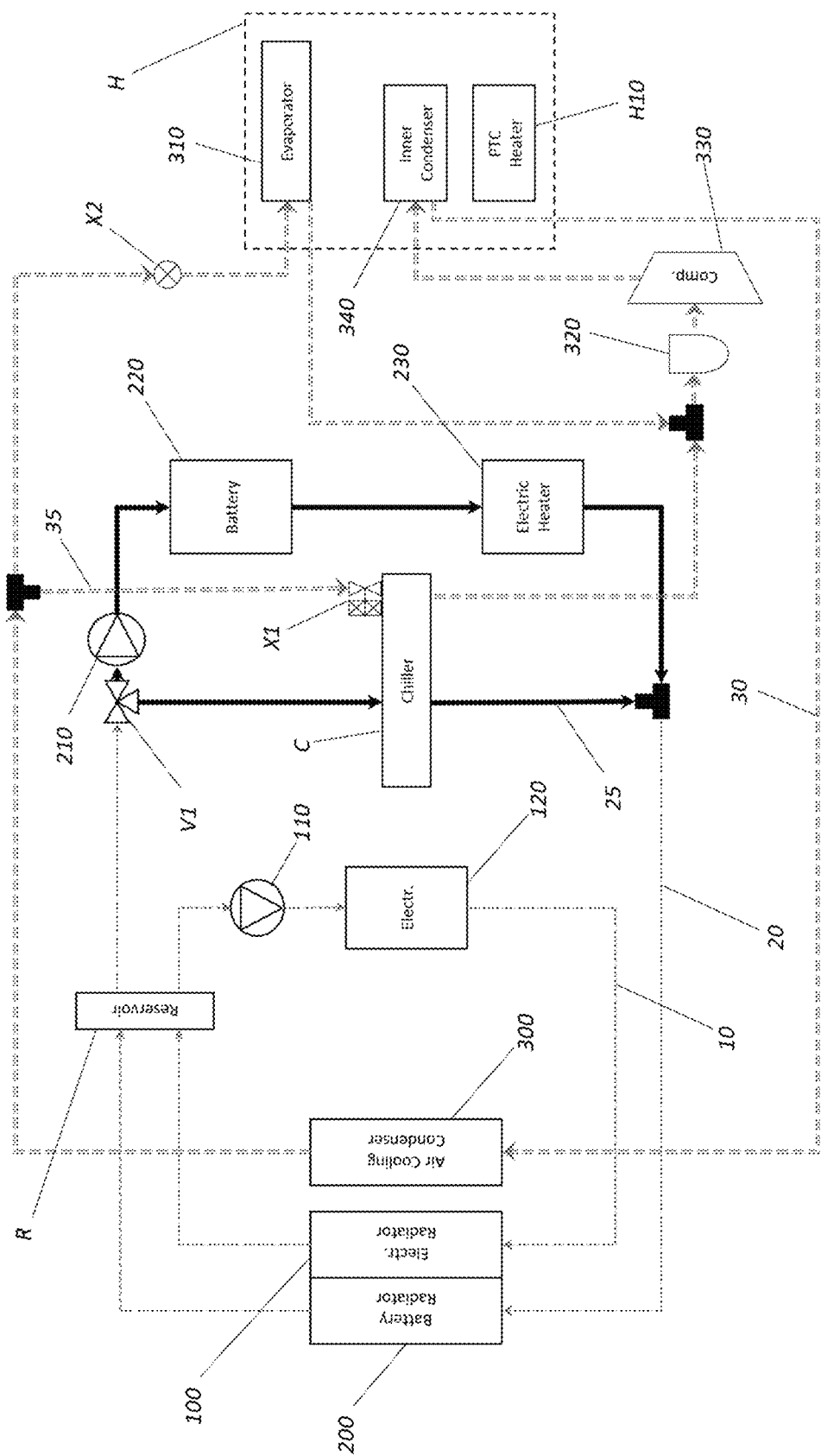
FIG. 12 is a view showing mode-based operations of an integrated thermal management system for vehicles according to one form of the present disclosure in which the high-voltage battery is heated using the water heater, and the interior of the vehicle may be separately heated through the electric heater.

FIG. 12 shows the case in which the high-voltage battery 220 is heated using the water heater 230, and the interior of the vehicle may be separately heated through the electric heater H10.

Figure 13:
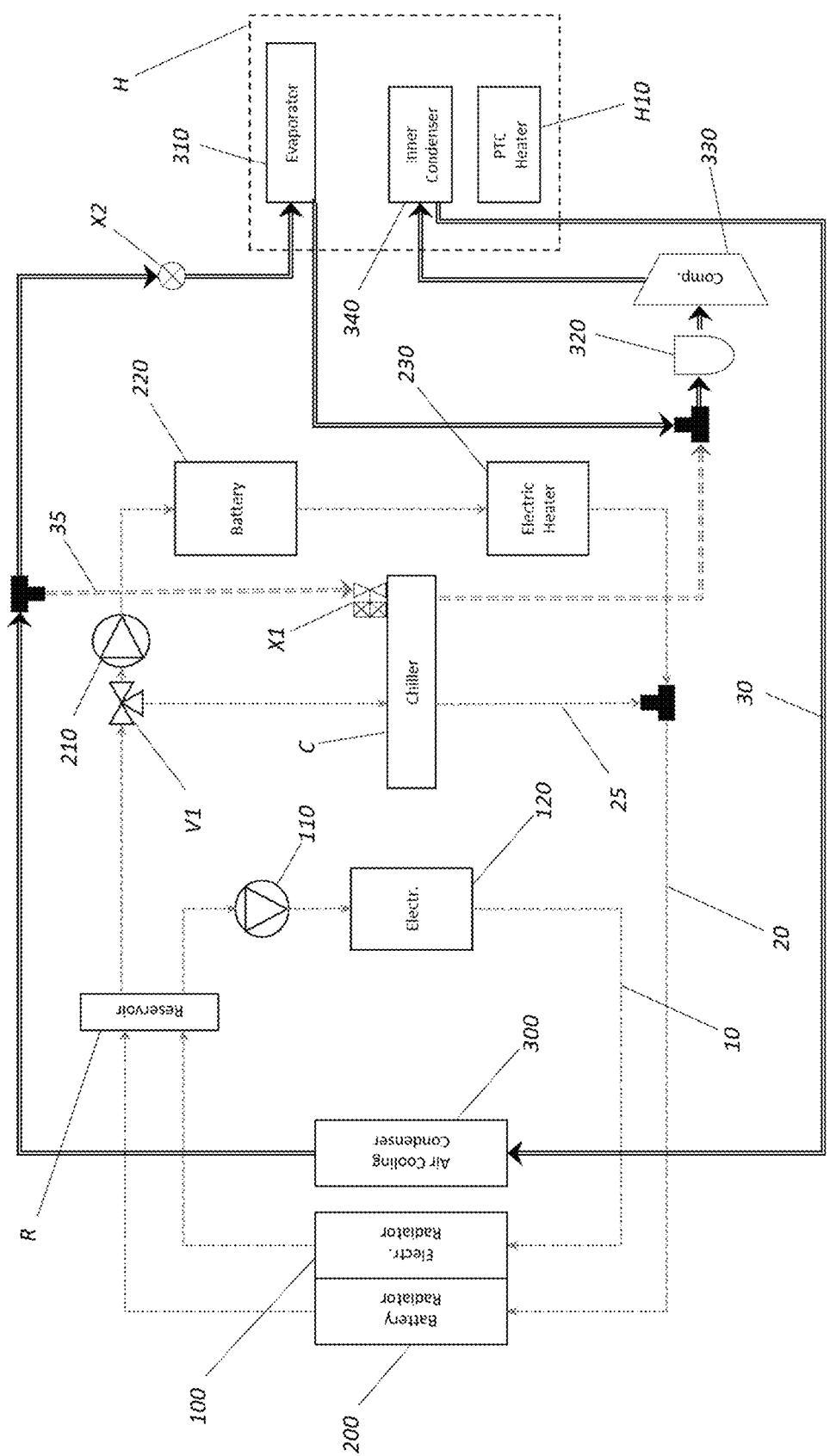
FIG. 13 Shows a dehumidification mode of an integrated thermal management system for vehicles according to one form of the present disclosure.

FIG. 13 shows a dehumidification mode, wherein the refrigerant passes through both the evaporator 310 and the inner condenser 340, air passes through the evaporator to reduce absolute humidity and is heated while passing through the inner condenser to reduce relative humidity, whereby dried air is discharged into the interior of the vehicle in order to dehumidify the interior of the vehicle.

Figure 14:
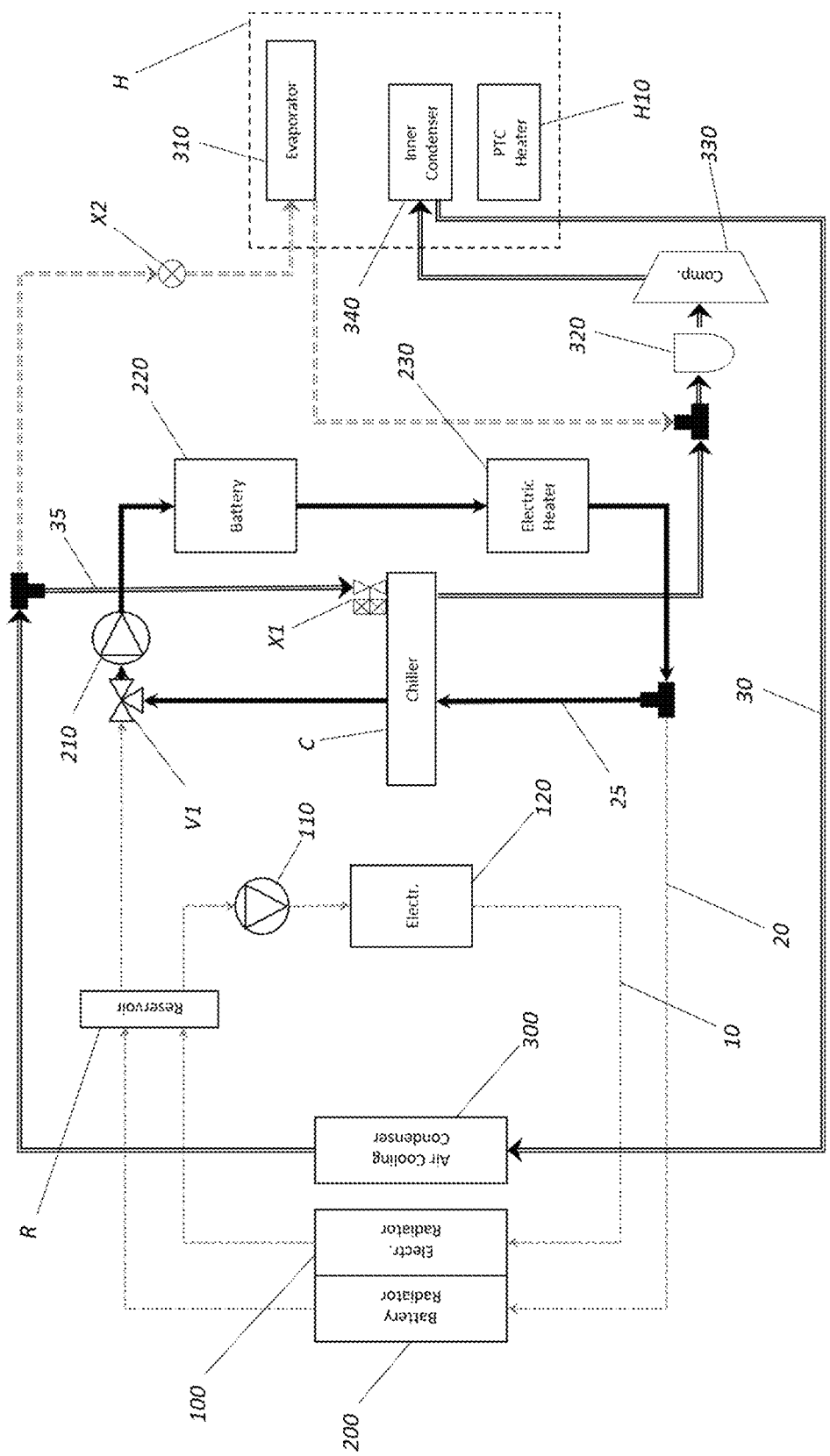
FIG. 14 is a view showing mode-based operations of an integrated thermal management system for vehicles according to one form of the present disclosure in which the high-voltage battery is rapidly charged depending on circumstances.
Figure 15:
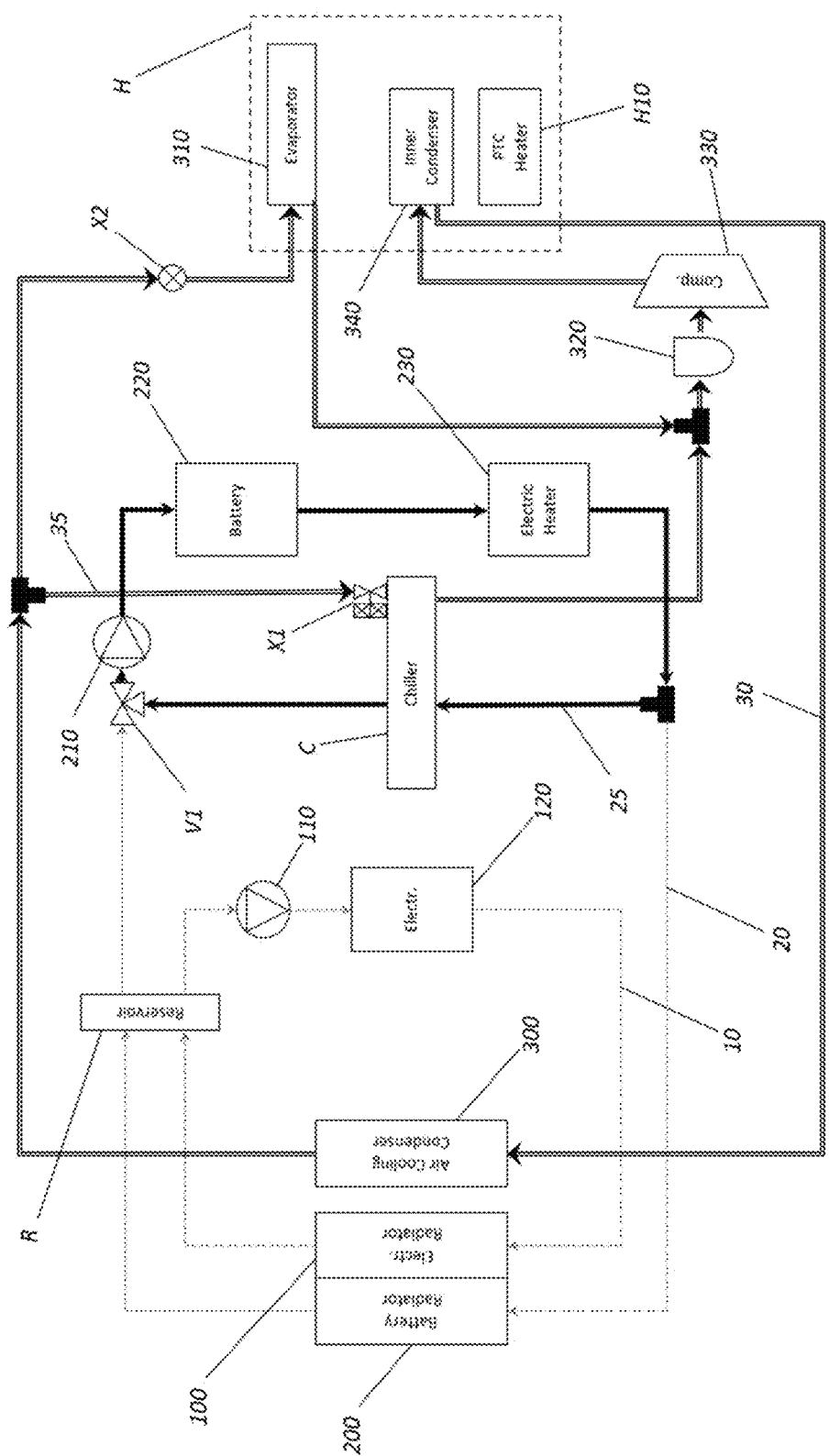
FIG. 15 is a view showing mode-based operations of an integrated thermal management system for vehicles according to one form of the present disclosure in which dehumidification is performed at the same time.

Meanwhile, in this form, no heat pump is used. However, in the case in which the high-voltage battery 220 is rapidly charged depending on circumstances, as shown in FIG. 14, the interior of the vehicle may be temporarily heated through the inner condenser 340 using extreme heat. In this case, dehumidification may also be performed at the same time, as shown in FIG. 15.

FIGS. 16 to 33 are views showing the mode-based operations of the integrated thermal management system for vehicles according to the other form of the present disclosure, each of which shows a circuit using the principle of the heat pump.

In this form, an auxiliary line 32 configured to allow the refrigerant to bypass the outdoor condenser 300 may be connected to the refrigerant line 30. As a result, it is possible to inhibit a phenomenon in which the outdoor condenser 300 is excessively cooled and frosted at the time of using a heat pump mode. When the outdoor condenser 300 is frosted in the heat pump mode, the refrigerant in the refrigerant line 30 may bypass the outdoor condenser 300 through the auxiliary line 32 and flow to the chiller C.

In addition, a dehumidification line 34 configured to allow the refrigerant flowing in the inner condenser 340 to be divided, to bypass the outdoor condenser 300, and to be introduced into the evaporator 310 may be connected to the refrigerant line 30. A third expansion valve X3 is provided upstream of a divergence point of the dehumidification line 34 in the refrigerant line 30. In the dehumidification mode, therefore, the refrigerant expanded through the third expansion valve X3 may be supplied to the chiller C and at the same time supplied to the evaporator 310 through the dehumidification line 34, and the refrigerants passing through the chiller C and the evaporator 310 may join each other and may be supplied to the compressor 330 and the inner condenser 340.

Figure 16:
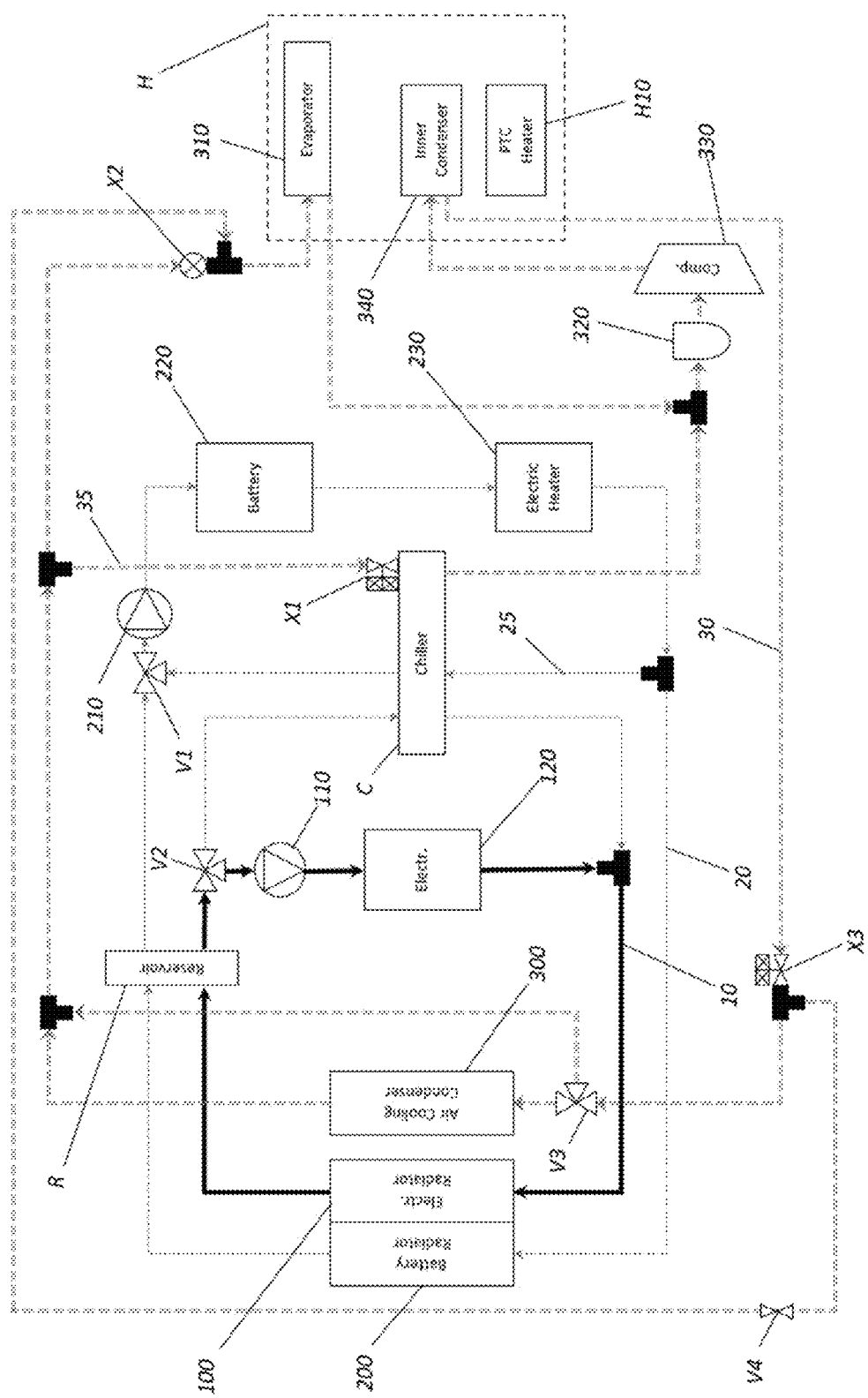
FIG. 16 is a view showing mode-based operations of an integrated thermal management system for vehicles according to another form of the present disclosure in which the electronic driving unit is cooled through the first cooling line.
Figure 17:
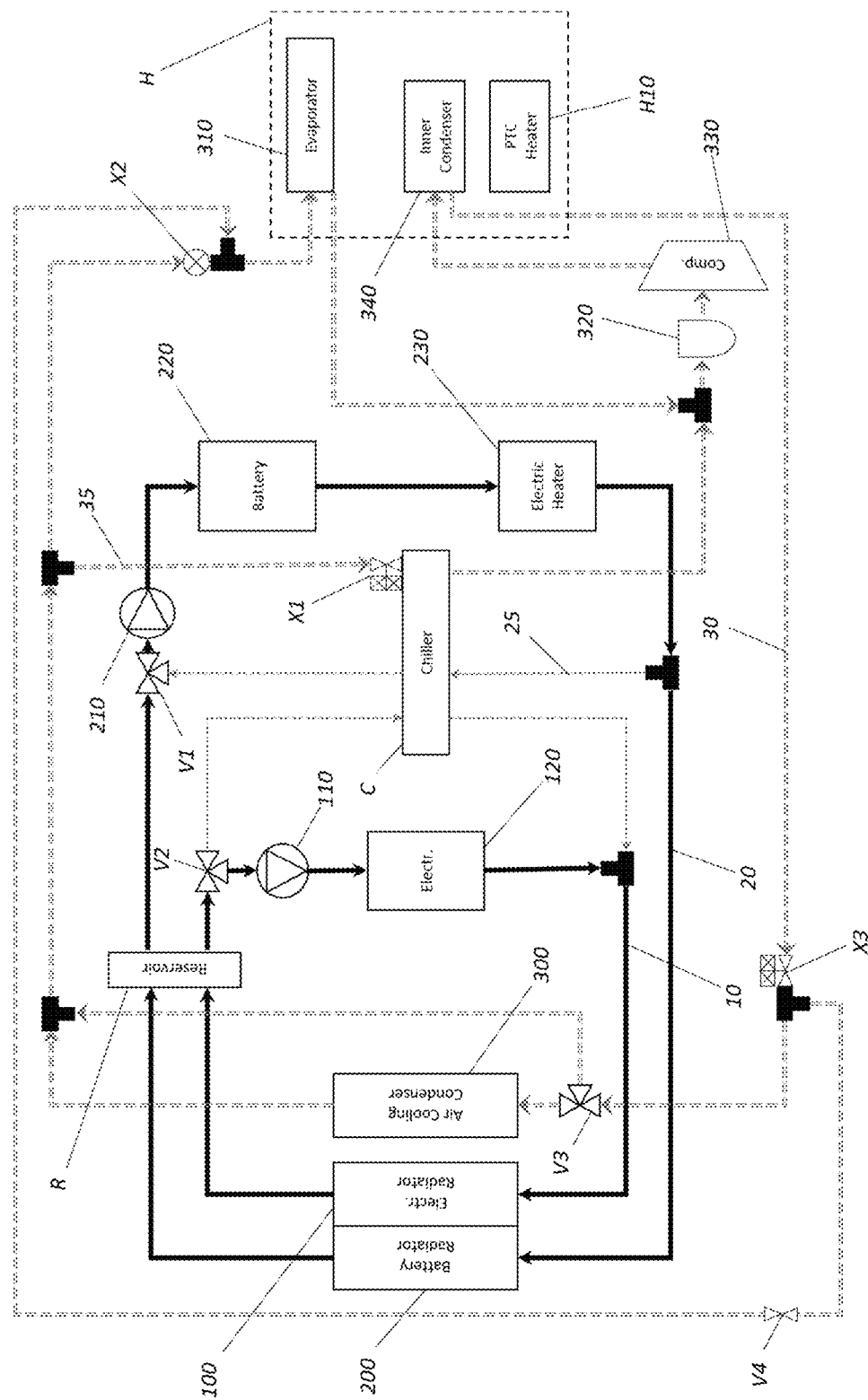
FIG. 17 is a view showing mode-based operations of an integrated thermal management system for vehicles according to another form of the present disclosure in which the electronic driving unit is cooled through the first radiator and the high-voltage battery is cooled through the second radiator.

Specifically, FIG. 16 shows the case in which the electronic driving unit 120 is cooled through the first cooling line 10. In this case, a second valve V2 is controlled such that the coolant flows to the electronic driving unit 120, rather than the chiller C. FIG. 17 shows the case in which the electronic driving unit 120 is cooled through the first radiator 100 and the high-voltage battery 220 is cooled through the second radiator 200.

Figure 18:
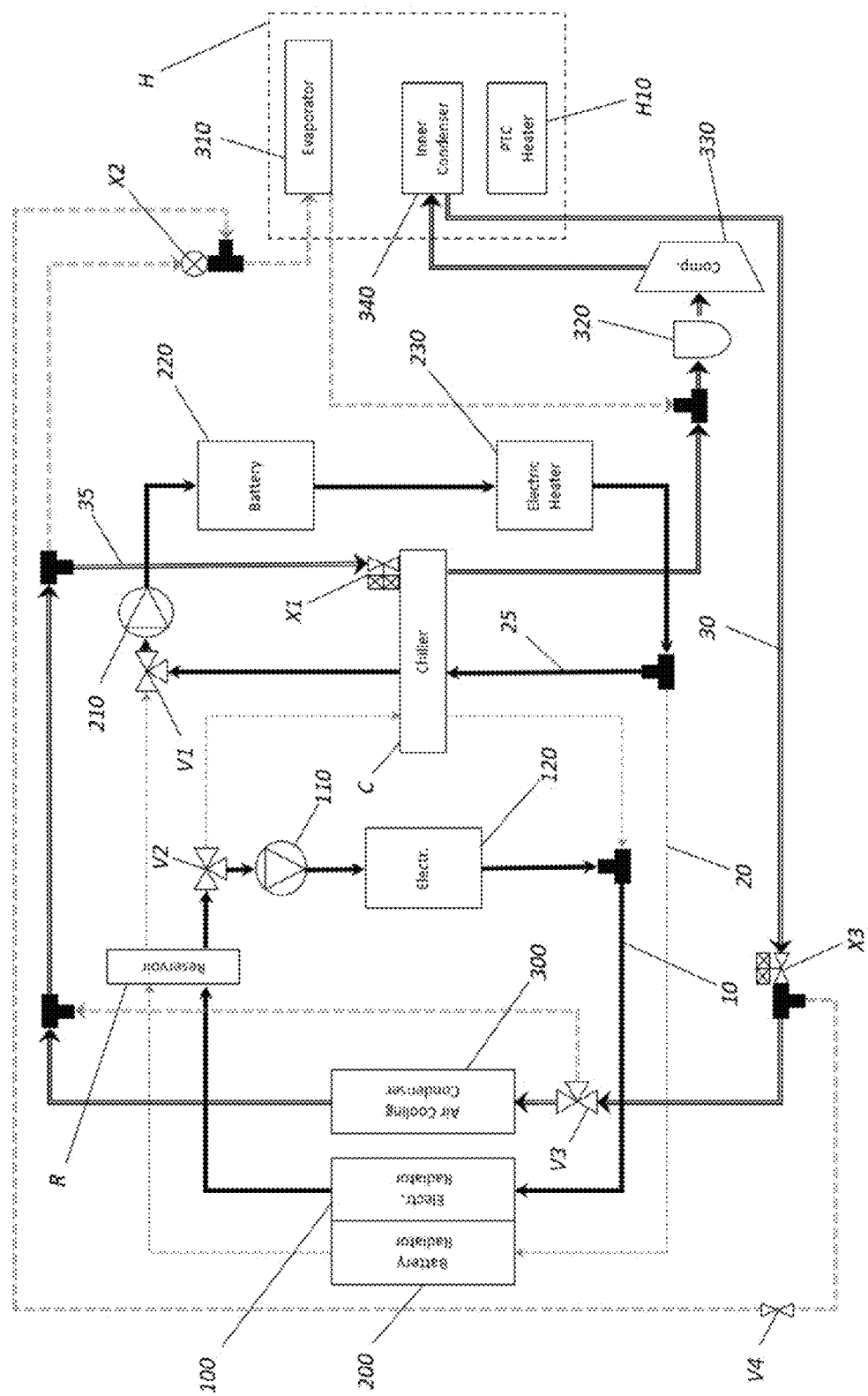
FIG. 18 is a view showing mode-based operations of an integrated thermal management system for vehicles according to another form of the present disclosure in which the electronic driving unit is cooled and the high-voltage battery is cooled through the chiller.

FIG. 18 shows the case in which the electronic driving unit 120 is cooled and the high-voltage battery 220 is cooled through the chiller C. In this case, the blower is not operated in the indoor air conditioner H, and therefore waste heat from the inner condenser 340 is inhibited from being introduced into the interior of the vehicle. The second expansion valve X2 is closed such that the refrigerant flows only to the chiller C. In addition, the third expansion valve X3 is fully opened such that expansion is not performed, and the refrigerant is expanded through the first expansion valve X1 such that the refrigerant is evaporated in the chiller C.

Figure 19:
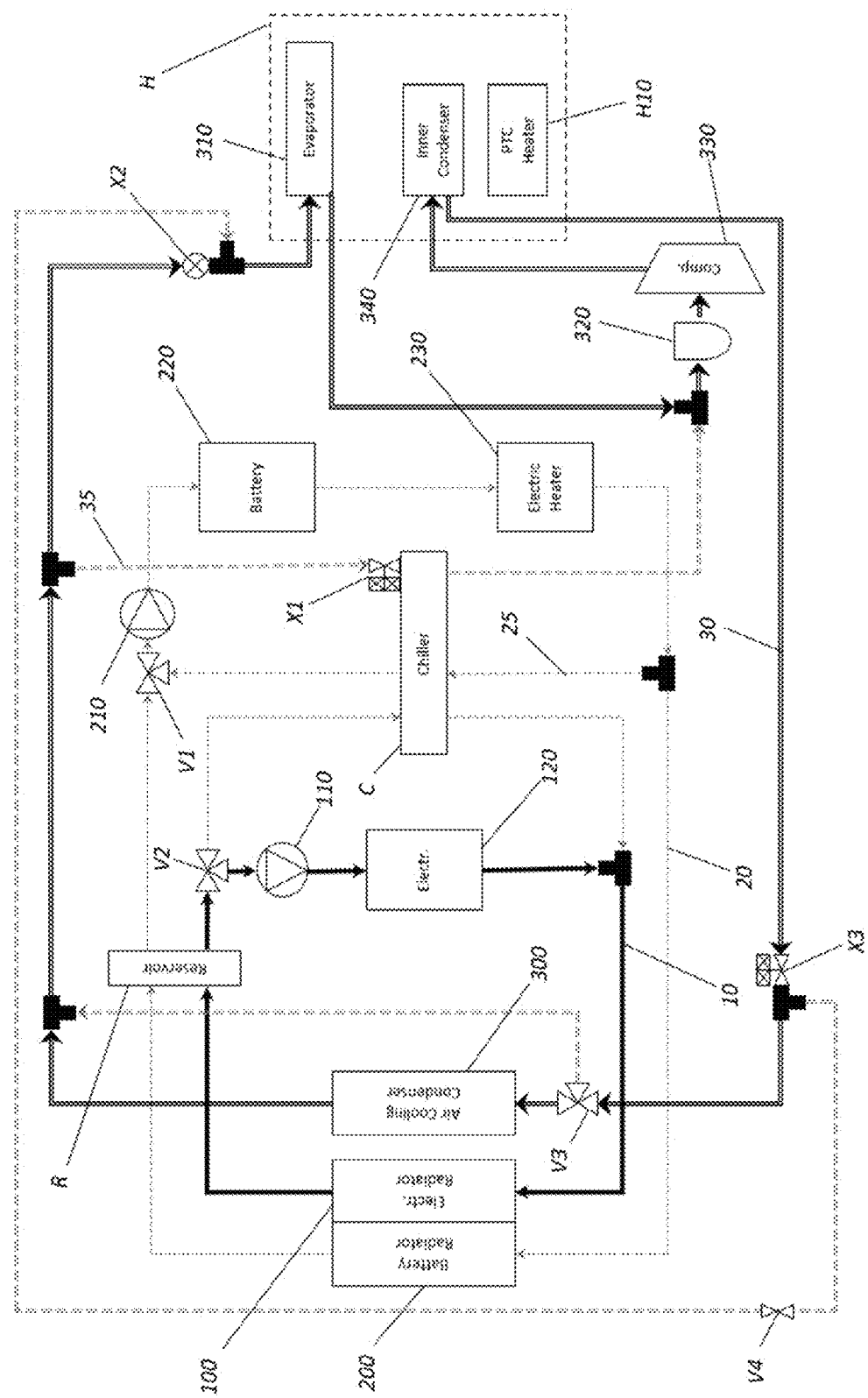
FIG. 19 is a view showing mode-based operations of an integrated thermal management system for vehicles according to another form of the present disclosure in which the electronic driving unit is cooled and at the same time the interior of the vehicle is cooled through the evaporator.

FIG. 19 shows the case in which the electronic driving unit 120 is cooled and at the same time the interior of the vehicle is cooled through the evaporator 310. In this case, the blower of the indoor air conditioner H is operated but air is inhibited from passing through the inner condenser 340 by the temperature control door therein such that only cool air is introduced into the interior of the vehicle. Alternatively, air may be discharged in the state in which the temperature thereof is controlled by the temperature control door. In this case, the first expansion valve X1 is closed such that the refrigerant is introduced only into the evaporator 310.

Figure 20:
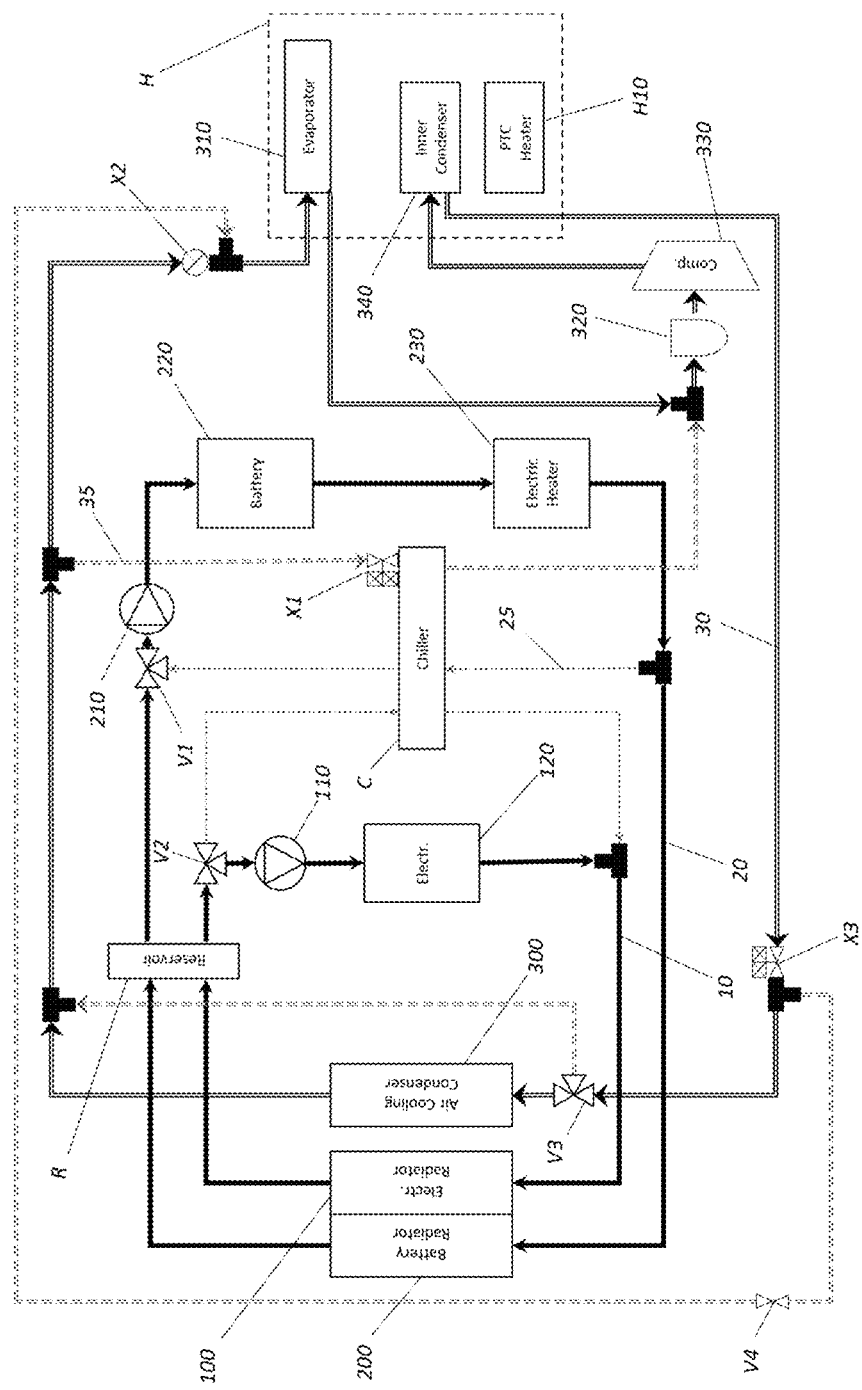
FIG. 20 is a view showing mode-based operations of an integrated thermal management system for vehicles according to another form of the present disclosure in which the high-voltage battery is further cooled, compared to the case of FIG. 19.
Figure 21:
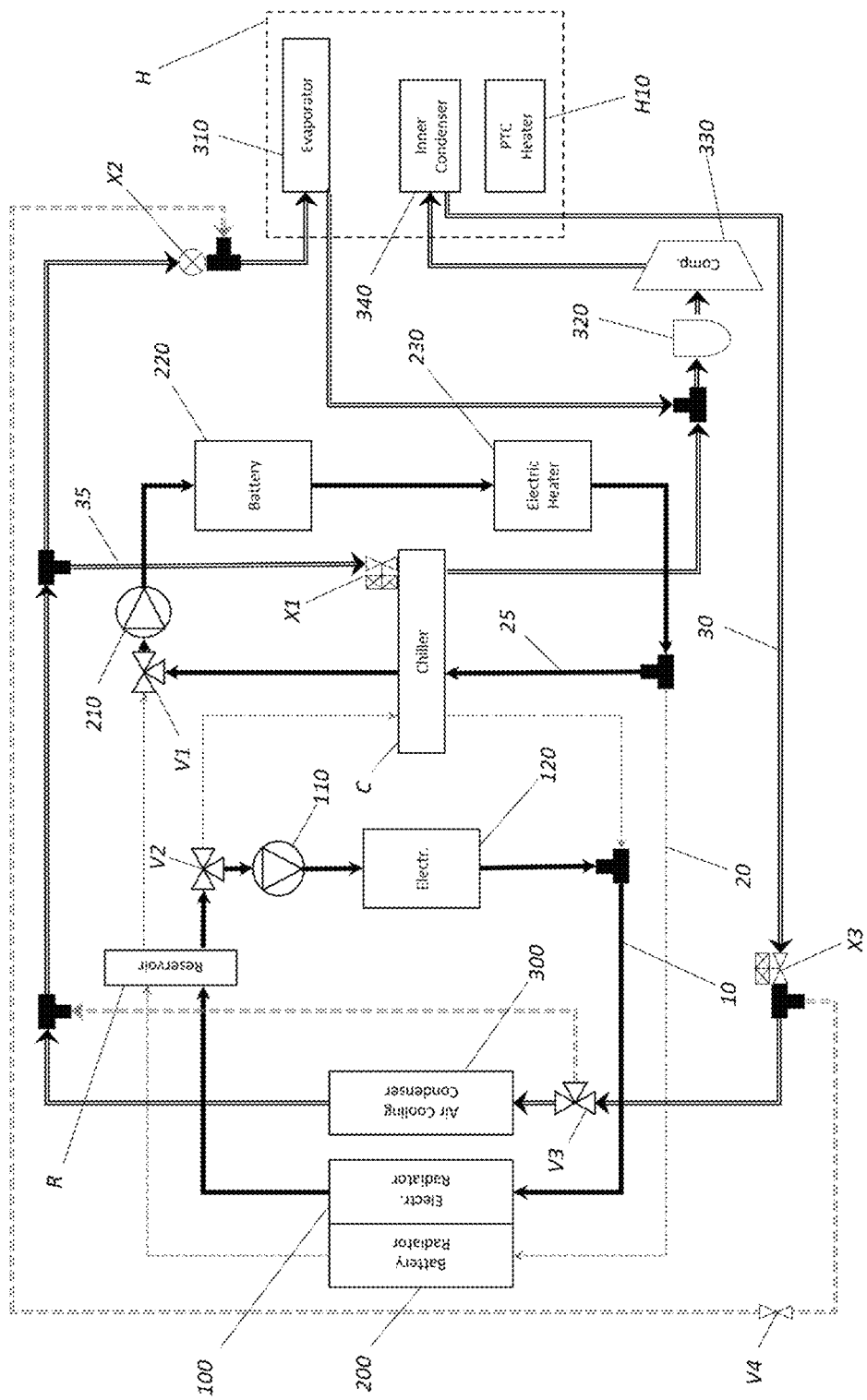
FIG. 21 is a view showing mode-based operations of an integrated thermal management system for vehicles according to another form of the present disclosure in which the high-voltage battery is more strongly cooled, in which case the high-voltage battery is cooled through the chiller.

FIG. 20 shows the case in which the high-voltage battery 220 is further cooled, compared to the case of FIG. 19. FIG. 21 shows the case in which the high-voltage battery 220 is more strongly cooled, in which case the high-voltage battery 220 is cooled through the chiller C. In this case, the refrigerant is expanded through both the first expansion valve X1 and the second expansion valve X2.

Figure 22:
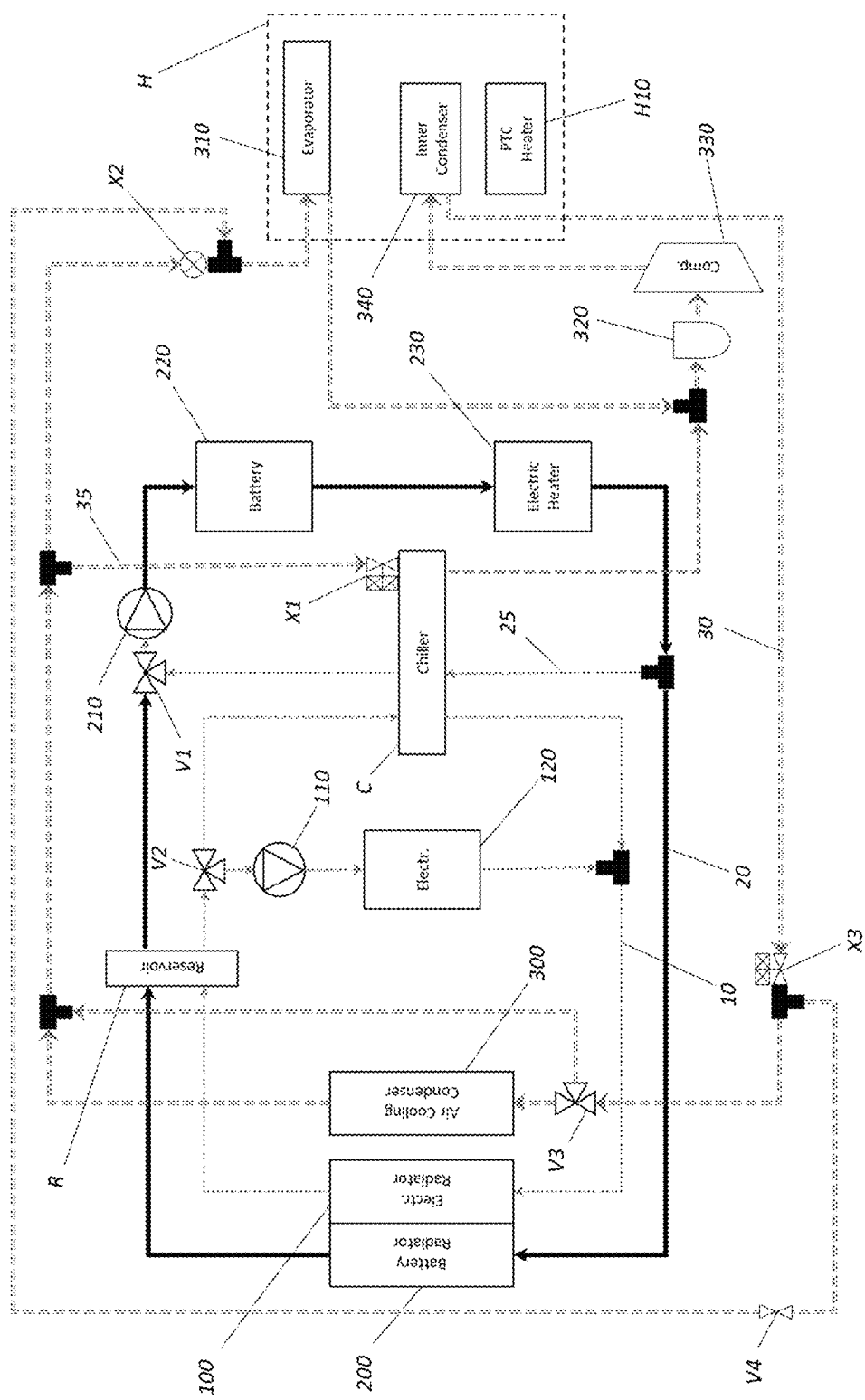
FIG. 22 is a view showing mode-based operations of an integrated thermal management system for vehicles according to another form of the present disclosure in which the high-voltage battery is cooled using the coolant.
Figure 23:
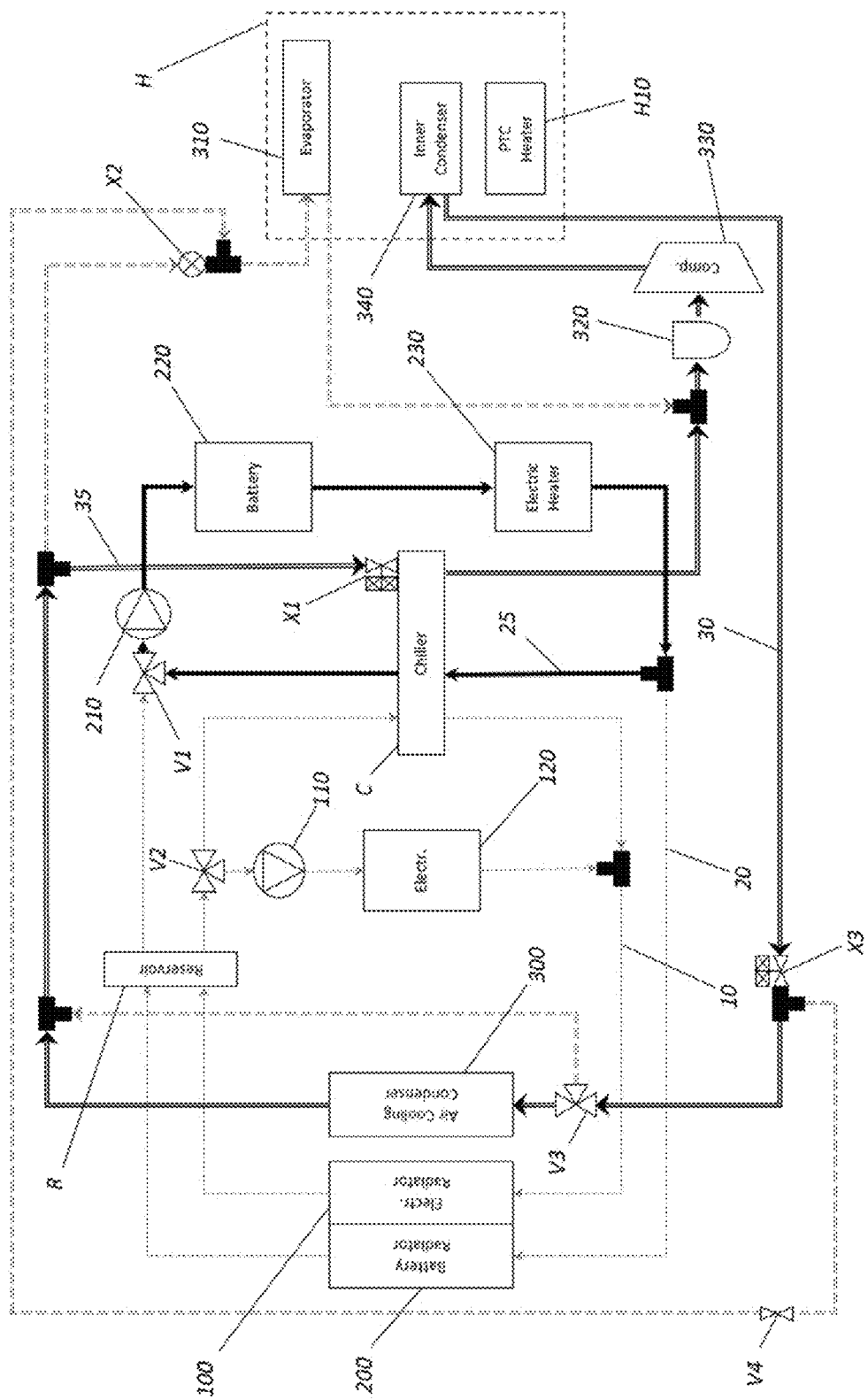
FIG. 23 is a view showing mode-based operations of an integrated thermal management system for vehicles according to another form of the present disclosure in which the high-voltage battery is more strongly cooled through the chiller.

FIG. 22 shows the case in which the high-voltage battery 220 is cooled using the coolant, and FIG. 23 shows the case in which the high-voltage battery 220 is more strongly cooled through the chiller C. In this case, the second expansion valve X2 is closed such that the refrigerant is not introduced into the evaporator 310.

Figure 24:
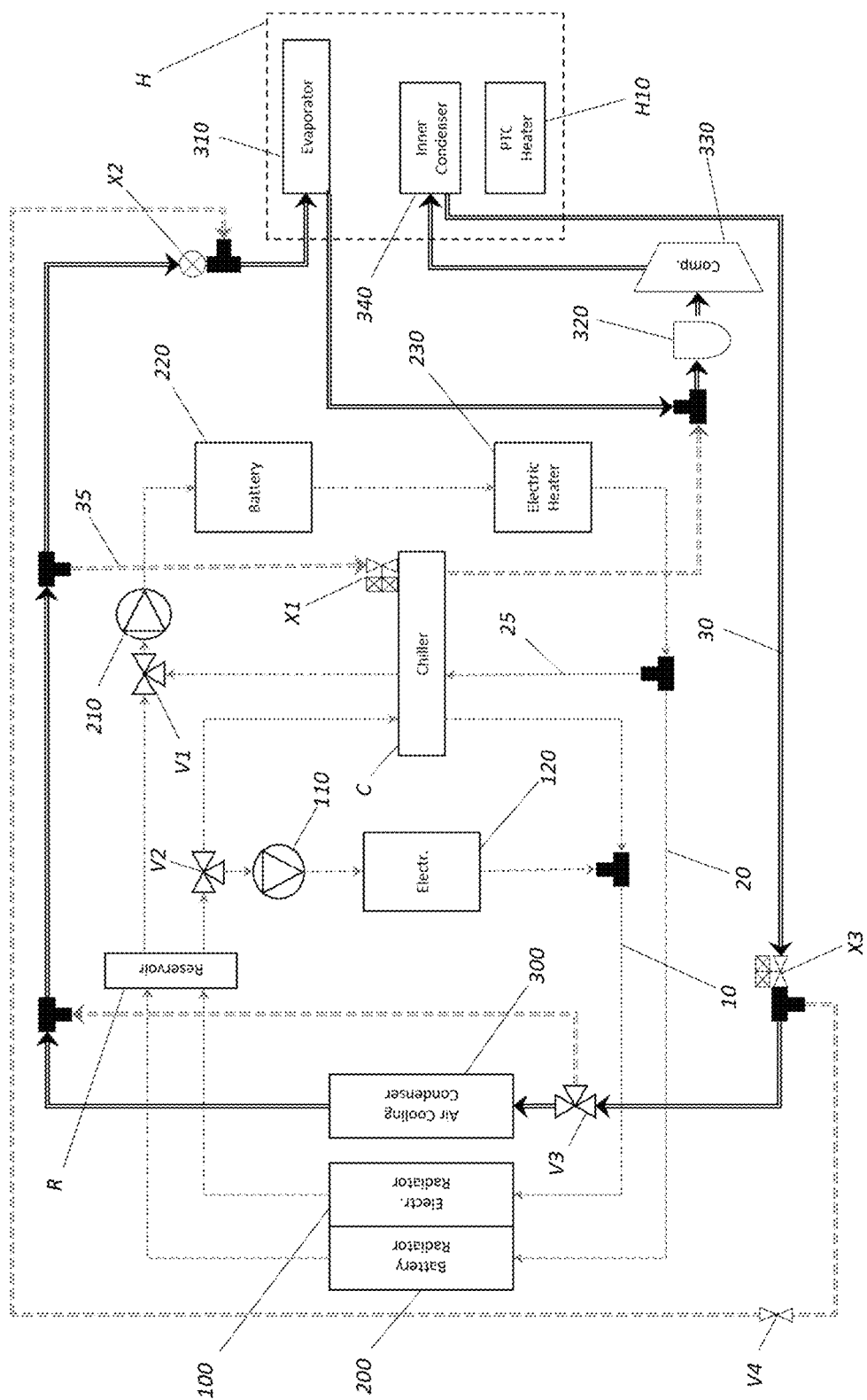
FIG. 24 is a view showing mode-based operations of an integrated thermal management system for vehicles according to another form of the present disclosure in which only the interior of the vehicle is cooled through the evaporator, in which case air is inhibited from passing through the inner condenser.
Figure 25:
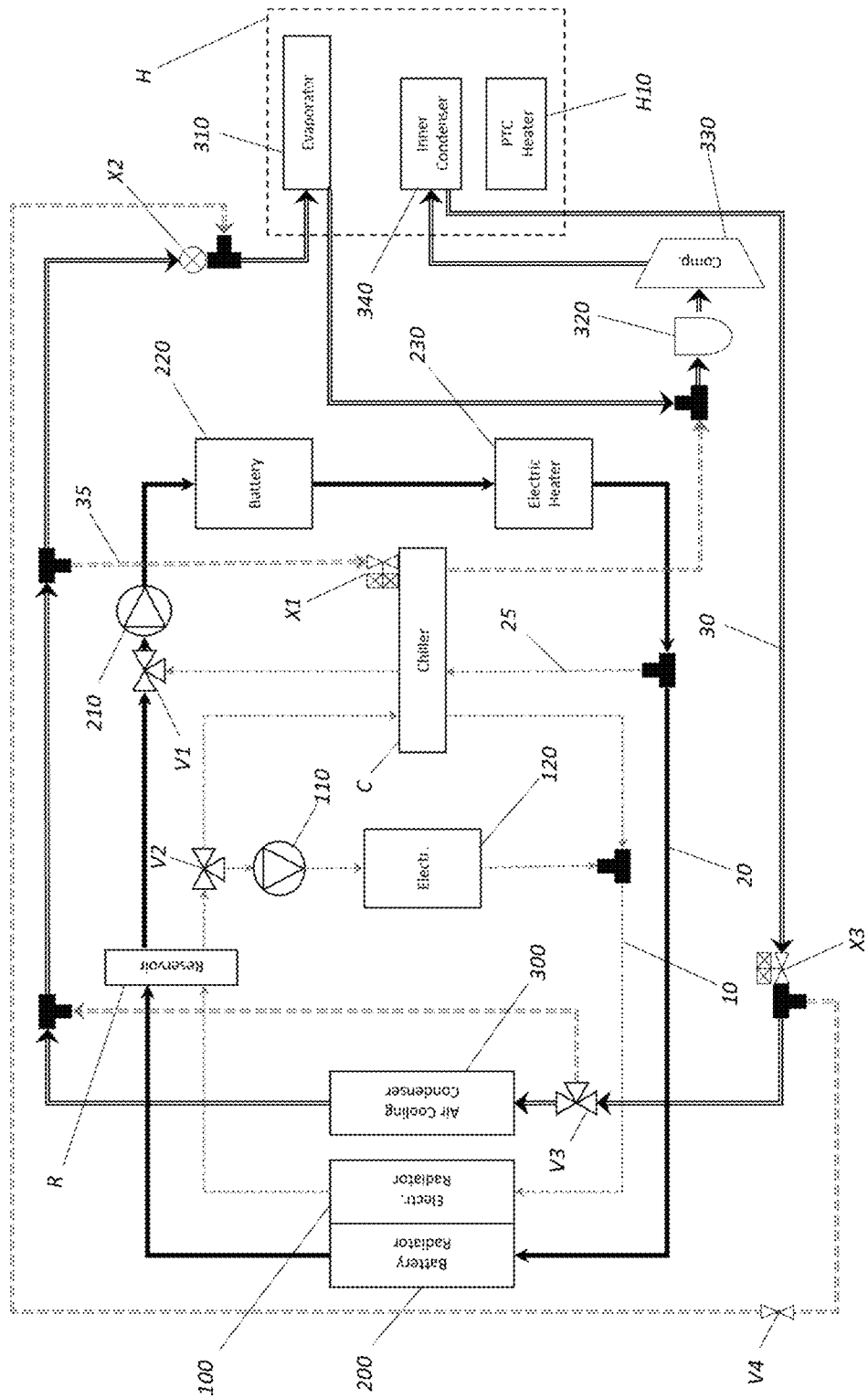
FIG. 25 is a view showing mode-based operations of an integrated thermal management system for vehicles according to another form of the present disclosure in which the high-voltage battery is also cooled using the coolant at the same time, compared to the case of FIG. 24.
Figure 26:
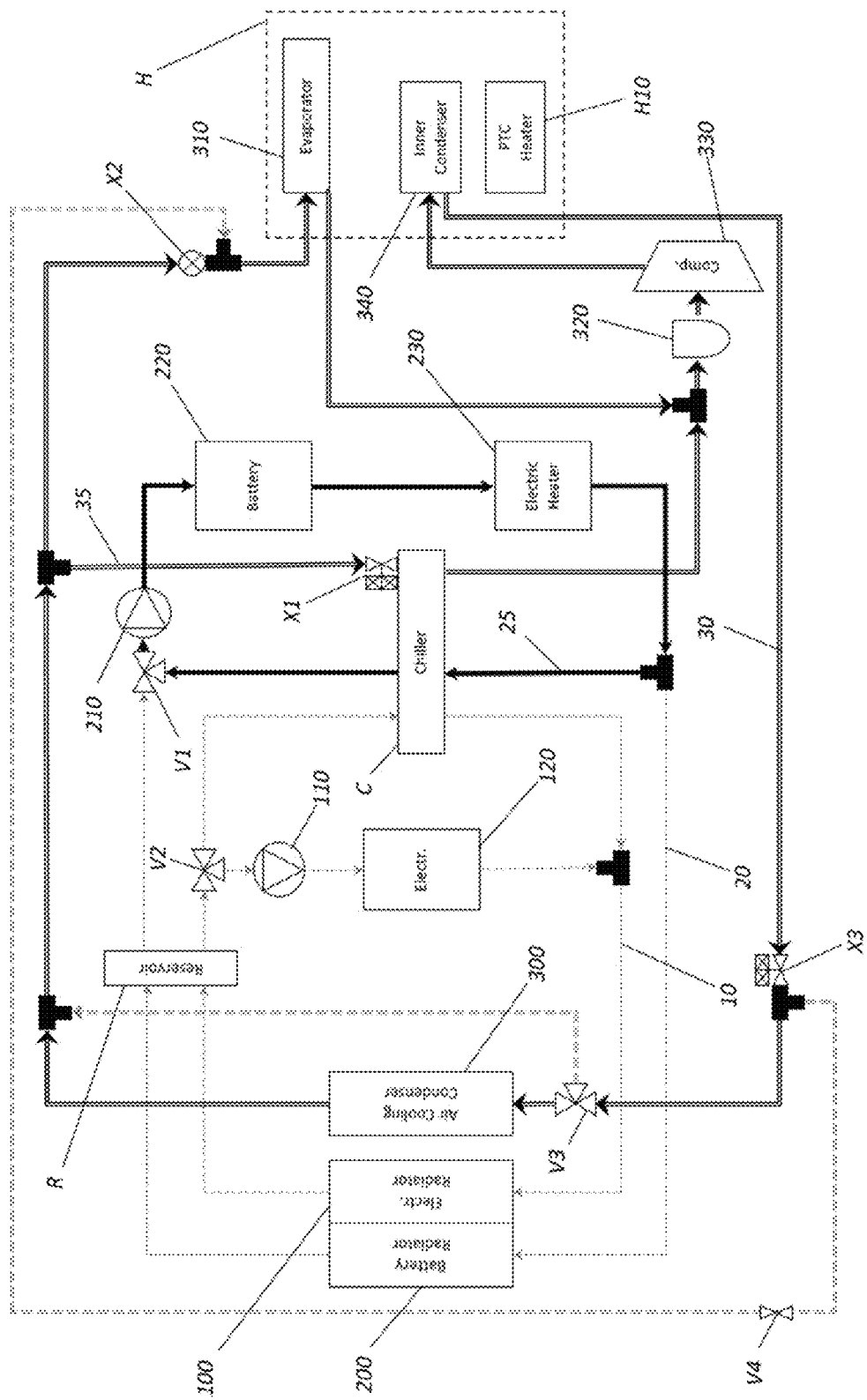
FIG. 26 is a view showing mode-based operations of an integrated thermal management system for vehicles according to another form of the present disclosure in which both the interior of the vehicle and the high-voltage battery are cooled using the refrigerant.

FIG. 24 shows the case in which only the interior of the vehicle is cooled through the evaporator 310, in which case air is inhibited from passing through the inner condenser 340. FIG. 25 shows the case in which the high-voltage battery 220 is also cooled using the coolant at the same time, compared to the case of FIG. 24. FIG. 26 shows the case in which both the interior of the vehicle and the high-voltage battery 220 are cooled using the refrigerant.

Figure 27:
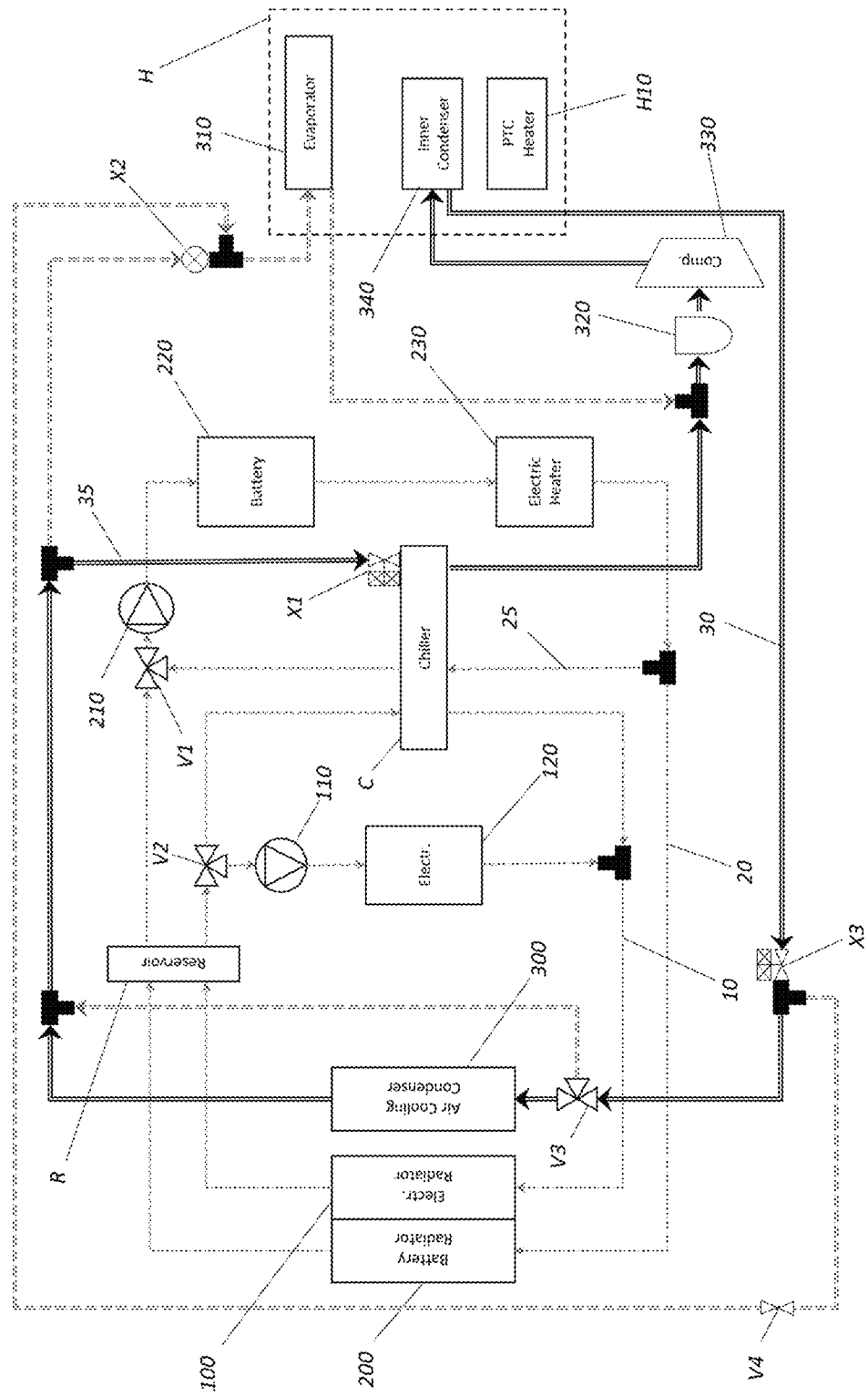
FIG. 27 is a view showing mode-based operations of an integrated thermal management system for vehicles according to another form of the present disclosure in which outdoor heat is absorbed through the outdoor condenser and the interior of the vehicle is heated through the inner condenser using the same according to the principle of the heat pump.
Figure 28:
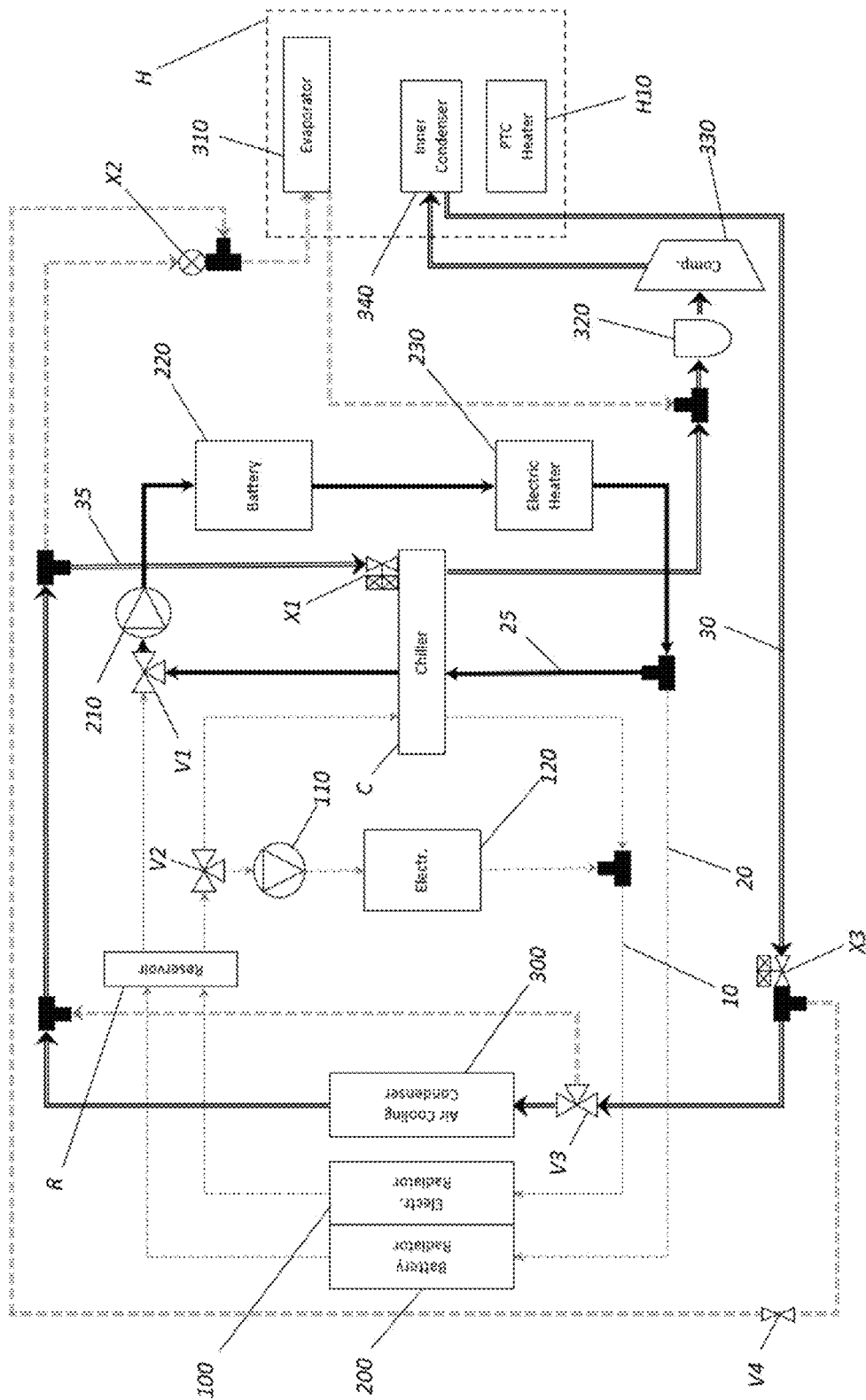
FIG. 28 is a view showing mode-based operations of an integrated thermal management system for vehicles according to another form of the present disclosure in which waste heat from the high-voltage battery is also absorbed through the chiller in order to more strongly heat the interior of the vehicle.
Figure 29:
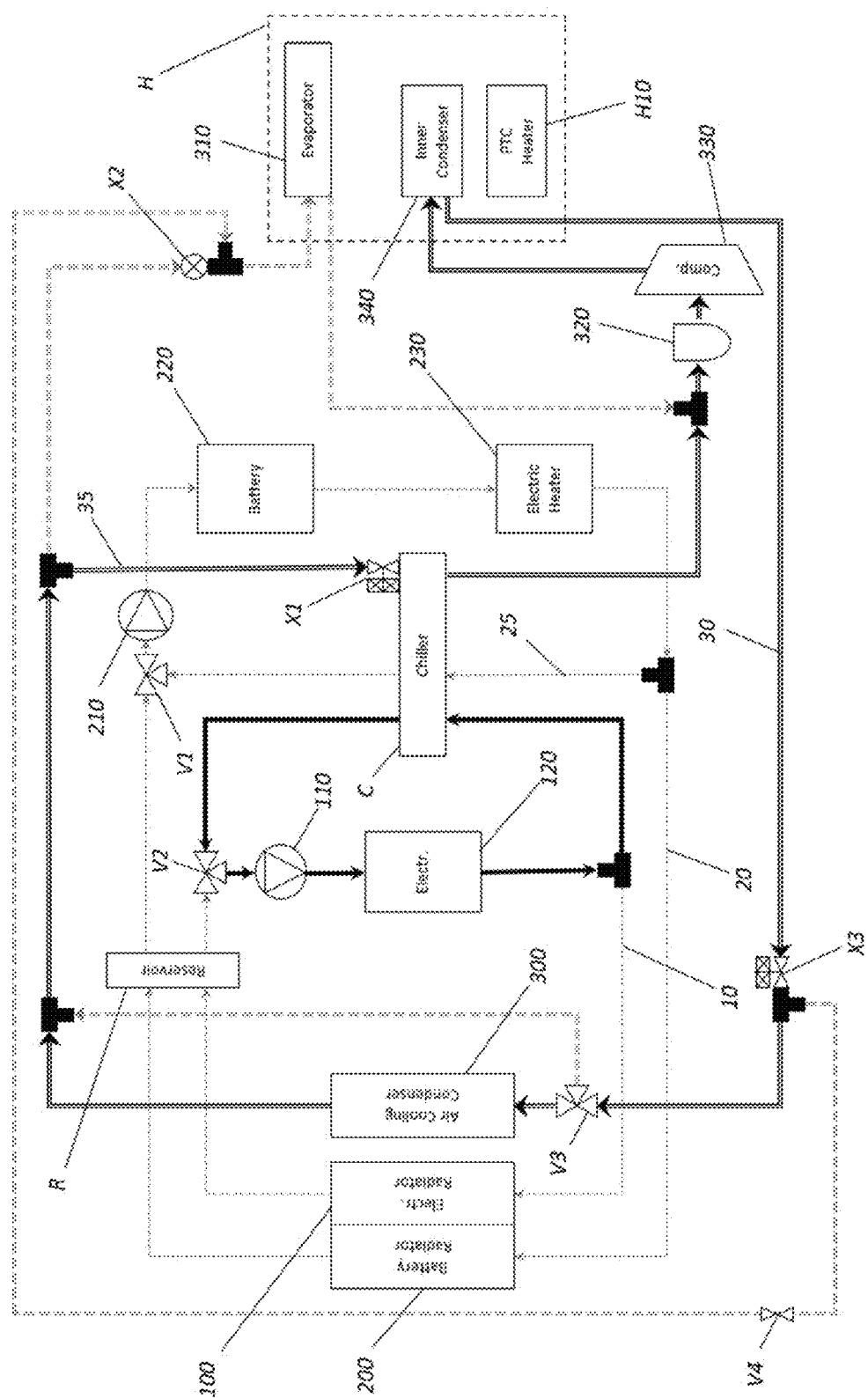
FIG. 29 is a view showing mode-based operations of an integrated thermal management system for vehicles according to another form of the present disclosure in which the interior of the vehicle is heated using both outdoor heat and waste heat from the electronic driving unit.
Figure 30:
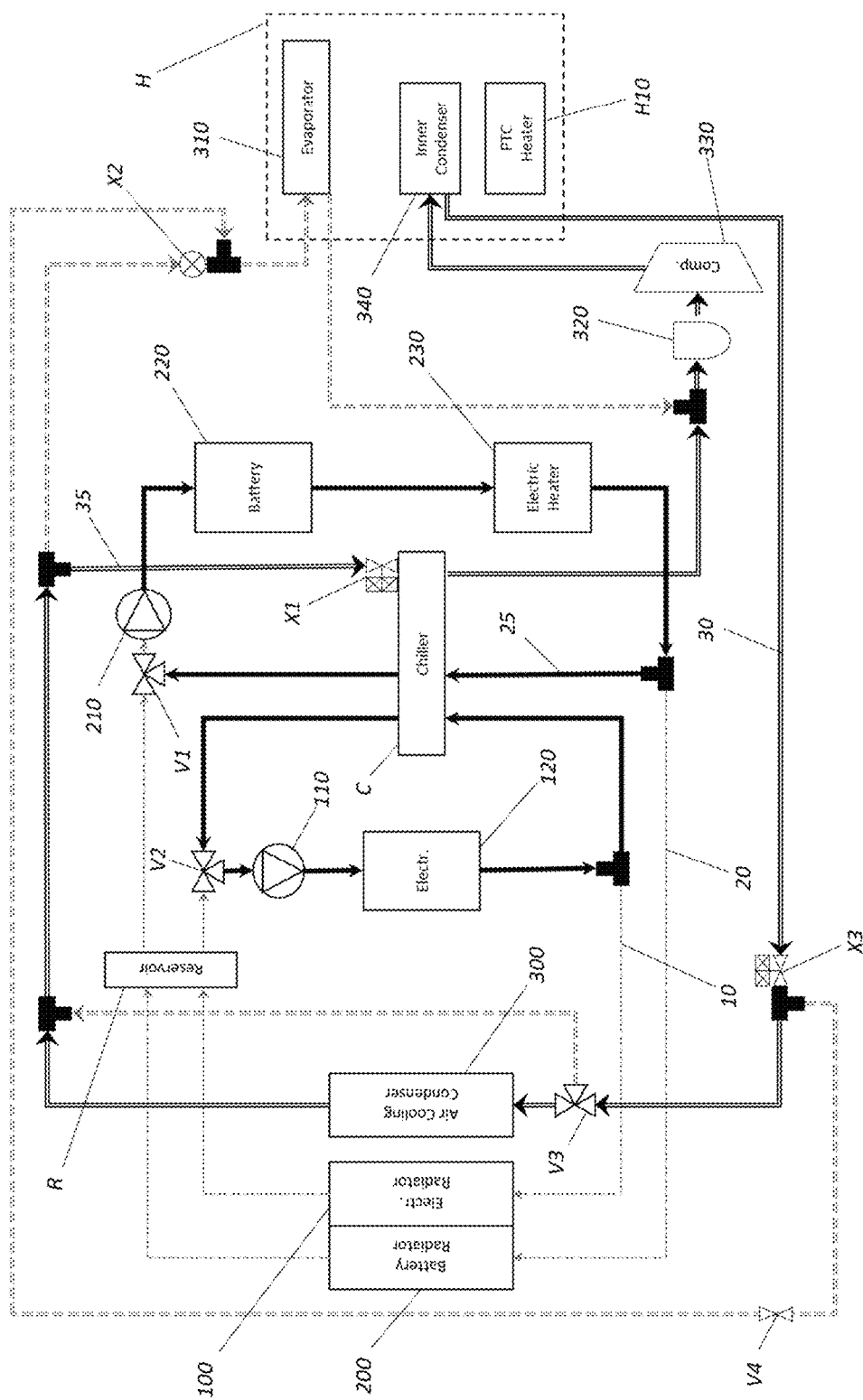
FIG. 30 is a view showing mode-based operations of an integrated thermal management system for vehicles according to another form of the present disclosure in which the interior of the vehicle is heated using all of outdoor heat, waste heat from the high-voltage battery, and waste heat from the electronic driving unit.

FIG. 27 shows the case in which outdoor heat is absorbed through the outdoor condenser 300 and the interior of the vehicle is heated through the inner condenser 340 using the same according to the principle of the heat pump. FIG. 28 shows the case in which waste heat from the high-voltage battery 220 is also absorbed through the chiller C in order to more strongly heat the interior of the vehicle. FIG. 29 shows the case in which the interior of the vehicle is heated using both outdoor heat and waste heat from the electronic driving unit 120. FIG. 30 shows the case in which the interior of the vehicle is heated using all of outdoor heat, waste heat from the high-voltage battery 220, and waste heat from the electronic driving unit 120. In the case in which heating is performed by driving the heat pump using the outdoor condenser 300, as described above, heat absorption by the outdoor condenser 300 is desired, and therefore the refrigerant is expanded through the third expansion valve X3.

Meanwhile, in the case in which the outdoor condenser 300 is frosted as the result of excessive evaporation of the refrigerant, a third valve V3 is temporarily controlled such that the refrigerant bypasses the outdoor condenser 300 through the auxiliary line 32. Thus, ice formed on the surface of the outdoor condenser 300 is naturally melted by external air, as shown in FIG. 31. In the case in which the outdoor condenser 300 is completely frosted, external air passes through the outdoor condenser 300 again such that the heat pump is used based on the external air. Additionally, in the case in which the auxiliary line 32 is not provided, the refrigerant passes through the outdoor condenser 300 when the outdoor condenser 300 is frosted. In this case, the third expansion valve X3 may be opened such that expansion is not performed, and expansion may instead be performed through the first expansion valve X1.

FIG. 32 shows the case in which dehumidification is performed using both the evaporator 310 and the inner condenser 340, in which case temperature is increased in the inner condenser 340 through the operation of the heat pump using heat absorbed by the outdoor condenser 300. In this case, a fourth valve V4, the second expansion valve X2, or the third valve V3 may be controlled to distribute the amount of the refrigerant flowing to the evaporator and the outdoor condenser 300. In the case in which the outdoor condenser is frosted, control may be temporarily performed to defrost the outdoor condenser, as shown in FIG. 33, and then dehumidification may be performed, as shown in FIG. 32.

As is apparent from the above description, the integrated thermal management system for vehicles according to the present disclosure is capable of independently controlling cooling and heating of the electronic driving unit, the high-voltage battery and air conditioning of the interior of the vehicle, and improving overall energy efficiency of the vehicle through integrated thermal management.

Although the preferred forms of the present disclosure have been described above with reference to the accompanying drawings, those skilled in the art will appreciate that the present disclosure can be implemented in various other forms without changing the technical ideas or features thereof.

What is claimed is:

1. An integrated thermal management system for vehicles, the integrated thermal management system comprising:
    a first cooling line configured to allow a coolant to circulate between an electronic driving unit and a first radiator;
    a second cooling line configured to allow a coolant to circulate between a high-voltage battery and a second radiator;
    a refrigerant line configured to allow a refrigerant to flow in order of a compressor, an inner condenser of an indoor air conditioner, and an outdoor condenser and to allow the refrigerant discharged from the outdoor condenser to be introduced into the compressor through an evaporator of the indoor air conditioner or a chiller; and
    a bypass line configured to diverge from the second cooling line, to be connected to the chiller, and configured to allow the coolant to bypass the second radiator and to circulate between the high-voltage battery and the chiller,
    wherein, in the indoor air conditioner, air having passed through the inner condenser passes through an electric heater.

2. The integrated thermal management system according to claim 1, wherein a first expansion valve is placed in a refrigerant inlet of the chiller, and a second expansion valve is placed in a refrigerant inlet of the evaporator.

3. The integrated thermal management system according to claim 1, wherein a water heater is placed downstream of the high-voltage battery in the second cooling line.

4. The integrated thermal management system according to claim 1, wherein the first cooling line and the second cooling line are connected to an integrated reservoir together.

5. The integrated thermal management system according to claim 1, wherein the first radiator and the second radiator are integrally coupled to each other.

6. The integrated thermal management system according to claim 1, further comprising: an auxiliary line configured to allow the refrigerant to bypass the outdoor condenser and connected to the refrigerant line.

7. The integrated thermal management system according to claim 6, wherein, when the outdoor condenser is frosted in a heat pump mode, the refrigerant in the refrigerant line bypasses the outdoor condenser through the auxiliary line and flows to the chiller.

8. The integrated thermal management system according to claim 1, further comprising: a dehumidification line connected to the refrigerant line, and configured to allow the refrigerant flowing in the inner condenser to be divided and allow the refrigerant to bypass the outdoor condenser and to be introduced into the evaporator.

9. The integrated thermal management system according to claim 8, further comprising: a third expansion valve placed in upstream of a divergence point of the dehumidification line in the refrigerant line,
wherein in a dehumidification mode, the refrigerant expanded through the third expansion valve is simultaneously supplied to the chiller and to the evaporator through the dehumidification line, and the refrigerant having passed through the chiller and the evaporator is supplied to the compressor and the inner condenser.

10. The integrated thermal management system according to claim 1, further comprising: an auxiliary line and a dehumidification line, each connected to the refrigerant line,
wherein the auxiliary line is configured to allow the refrigerant flowing in the inner condenser to be divided, to bypass the outdoor condenser, and to flow to the evaporator or the chiller, and
the dehumidification line is configured to allow the refrigerant flowing in the inner condenser to bypass the outdoor condenser and to be introduced into the evaporator.

11. The integrated thermal management system according to claim 1, further comprising: a first pump is placed in the first cooling line, and a second pump is placed in the second cooling line.

12. The integrated thermal management system according to claim 11, wherein a three-way valve is placed at a divergence point between the second cooling line and the bypass line, and the second pump is placed between the three-way valve and the high-voltage battery.

13. The integrated thermal management system according to claim 12, wherein the first pump, the second pump, the three-way valve, and the chiller are coupled to each other and form a module.

14. The integrated thermal management system according to claim 12, wherein the first cooling line and the second cooling line are connected to an integrated reservoir together, and
the first pump, the second pump, the three-way valve, and the chiller are coupled to the integrated reservoir and form a module.

* * * * *